(12) United States Patent
Copley et al.

(10) Patent No.: US 10,001,040 B2
(45) Date of Patent: Jun. 19, 2018

(54) SEPARATOR

(71) Applicant: Parker Hannifin Manufacturing (UK) Ltd., Hemel Hempstead (GB)

(72) Inventors: Daniel J. Copley, Oxford, MS (US); Adrian Richard Mincher, Leeds (GB)

(73) Assignee: Parker Hannifin Manufacturing (UK) Ltd., Hemel Hempstead, Hertfordshire (GB)

(*) Notice: Subject to any disclaimer, the term of this patent is extended or adjusted under 35 U.S.C. 154(b) by 178 days.

(21) Appl. No.: 14/868,637

(22) Filed: Sep. 29, 2015

(65) Prior Publication Data

US 2016/0090881 A1 Mar. 31, 2016

Related U.S. Application Data

(60) Division of application No. 14/139,138, filed on Dec. 23, 2013, now Pat. No. 9,181,907, which is a
(Continued)

(30) Foreign Application Priority Data

Jul. 29, 2011 (GB) .................................. 1113072.1

(51) Int. Cl.
  *B01D 50/00* (2006.01)
  *F01M 13/04* (2006.01)
  (Continued)

(52) U.S. Cl.
  CPC ............ *F01M 13/04* (2013.01); *B01D 45/08* (2013.01); *B01D 45/16* (2013.01);
  (Continued)

(58) Field of Classification Search
  CPC ........... F01M 13/04; F01M 2013/0433; F01M 2013/0438; F01M 2013/0072;
  (Continued)

(56) References Cited

U.S. PATENT DOCUMENTS

| 5,499,616 A | 3/1996 | Enright |
| 6,290,738 B1* | 9/2001 | Holm .................... B01D 45/08 |
| | | 55/309 |

(Continued)

FOREIGN PATENT DOCUMENTS

| DE | 10 2006 041 213 A1 | 3/2008 |
| DE | 10 2008 044 857 A1 | 8/2010 |

(Continued)

OTHER PUBLICATIONS

Separator, WO2011095790, two pages, 2011.*
(Continued)

*Primary Examiner* — Dung H Bui
(74) *Attorney, Agent, or Firm* — Christopher H. Hunter

(57) ABSTRACT

A separator has a first inlet arranged to receive a fluid stream, and first and second separation stages coupled together in series; A pump coupled to the second separation stage generates an area of reduced pressure to draw the fluid stream through the first and second separation stages. One of the stages includes a variable impactor separator comprising a first chamber arranged to receive the fluid stream, and a second chamber coupled to the first chamber through an aperture to accelerate the first fluid stream. The stream is incident upon an impaction surface to separate contaminants from the fluid stream. An actuator adjusts the open area of the aperture according to a pressure differential between fluid pressure in the first chamber and a reference fluid pressure in a third chamber. The other of the separation stages is a second variable impactor separator or a filter media.

13 Claims, 12 Drawing Sheets

Related U.S. Application Data continuation of application No. PCT/GB2012/051729, filed on Jul. 19, 2012.

(51) Int. Cl.

| | |
|---|---|
| *B01D 45/16* | (2006.01) |
| *B01D 45/08* | (2006.01) |
| *F02M 35/022* | (2006.01) |
| *B01D 46/00* | (2006.01) |
| *F02M 25/06* | (2016.01) |
| *F01M 13/00* | (2006.01) |
| *F01M 13/02* | (2006.01) |

(52) U.S. Cl.
CPC ....... *B01D 46/0031* (2013.01); *B01D 50/002* (2013.01); *F02M 35/0223* (2013.01); *F02M 35/0226* (2013.01); *F01M 2013/0016* (2013.01); *F01M 2013/0072* (2013.01); *F01M 2013/026* (2013.01); *F01M 2013/0433* (2013.01); *F01M 2013/0438* (2013.01); *F02M 25/06* (2013.01)

(58) Field of Classification Search
CPC ..... F01M 2013/0016; F01M 2013/026; B01D 46/0031; B01D 45/08; B01D 50/002; B01D 45/16; F02M 35/0226; F02M 35/0223; F02M 25/06
See application file for complete search history.

(56) References Cited

U.S. PATENT DOCUMENTS

| | | | | |
|---|---|---|---|---|
| 7,473,291 | B2 | 1/2009 | Evanstad | |
| 8,152,884 | B1* | 4/2012 | Severance | B01D 45/08 55/462 |
| 8,915,237 | B2* | 12/2014 | Copley | B01D 45/08 123/41.86 |
| 2003/0150436 | A1* | 8/2003 | Stegmaier | F01M 13/022 123/572 |
| 2004/0079229 | A1* | 4/2004 | Daly | B01D 45/16 95/268 |
| 2006/0059875 | A1 | 3/2006 | Malgorn | |
| 2006/0249128 | A1* | 11/2006 | Shieh | F01M 13/0011 123/572 |
| 2007/0181108 | A1* | 8/2007 | Shieh | F01M 13/04 123/572 |
| 2008/0264018 | A1* | 10/2008 | Herman | B01D 45/08 55/462 |
| 2009/0050121 | A1* | 2/2009 | Holzmann | B01D 45/04 123/573 |
| 2009/0100811 | A1* | 4/2009 | Scheckel | B01D 45/08 55/448 |
| 2009/0199826 | A1* | 8/2009 | Meinig | B01D 45/08 123/573 |
| 2009/0288560 | A1 | 11/2009 | Ruppel | |
| 2010/0006075 | A1 | 1/2010 | Ruppel | |
| 2010/0101425 | A1 | 4/2010 | Herman | |
| 2010/0126479 | A1* | 5/2010 | Shieh | F01M 13/04 123/573 |
| 2010/0199958 | A1* | 8/2010 | Heckel | F02M 25/06 123/572 |
| 2010/0294218 | A1 | 11/2010 | Ruppel | |
| 2011/0094052 | A1* | 4/2011 | Witter | B01D 46/2411 15/347 |
| 2011/0180051 | A1* | 7/2011 | Schwandt | F01M 13/04 123/573 |
| 2011/0247309 | A1* | 10/2011 | Smith | F01M 13/04 55/447 |
| 2012/0255529 | A1* | 10/2012 | Mincher | F01M 13/023 123/574 |
| 2012/0318215 | A1* | 12/2012 | Copley | B01D 45/08 123/41.86 |
| 2013/0205726 | A1* | 8/2013 | Wada | B01D 46/003 55/337 |
| 2014/0033922 | A1* | 2/2014 | Peck | F01M 13/04 95/272 |
| 2014/0109885 | A1* | 4/2014 | Kalayci | F01M 13/0011 123/572 |

FOREIGN PATENT DOCUMENTS

| | | | | |
|---|---|---|---|---|
| WO | WO-9825013 A1 * | 6/1998 | | F01N 3/32 |
| WO | 2009025927 A1 | 2/2009 | | |
| WO | 2009037496 A2 | 3/2009 | | |
| WO | 2011014289 A1 | 2/2011 | | |
| WO | 2011095790 A1 | 8/2011 | | |
| WO | 2013017832 A1 | 2/2013 | | |

OTHER PUBLICATIONS

International Search Report and Written Opinion for International Application No. PCT/GB2012/051729 dated Oct. 26, 2012.
Notification of Transmittal of the International Preliminary Report on Patentability for International Application No. PCT/GB2011/050043 dated May 14, 2012.

* cited by examiner

SEPARATOR

CROSS REFERENCE TO RELATED APPLICATIONS

The present application is a division of U.S. application Ser. No. 14/139,138, filed Dec. 23, 2013, which is a continuation of International Application No. PCT/GB2012/051729, filed Jul. 19, 2012, and which designated the United States; and which claims priority to Great Britain Application No. 1113072.1, filed Jul. 29, 2011, the disclosures of which are expressly incorporated herein by reference.

BACKGROUND OF THE INVENTION

The present invention relates to a separator. In particular, the present invention relates to a separator for separating particulate, liquid and aerosol contaminants from a fluid stream. Certain embodiments of the present invention relate to a separator for separating particulate, liquid and aerosol contaminants from a blow-by gas stream within a reciprocating engine. Separators in accordance with particular embodiments of the present invention incorporate mechanisms for regulating the pressure within a crankcase ventilation system. Embodiments of the present invention provide a pump assisted integral separator and regulator suitable for use in a crankcase ventilation system.

Blow-by gas within a reciprocating engine is generated as a by-product of the combustion process. During combustion, some of the mixture of combustion gases escape past piston rings or other seals and enter the engine crankcase outside of the pistons. The term "blow-by" refers to the fact that the gas has blown past the piston seals. The flow level of blow-by gas is dependent upon several factors, for example the engine displacement, the effectiveness of the piston cylinder seals and the power output of the engine. Blow-by gas typically has the following components: oil (as both a liquid and an aerosol, with aerosol droplets in the range 0.1 μm to 10 μm), soot particles, nitrous oxides (NOx), hydrocarbons (both gaseous hydrocarbons and gaseous aldehydes), carbon monoxide, carbon dioxide, oxygen, water and other gaseous air components.

If blow-by gas is retained within a crankcase with no outlet the pressure within the crankcase rises until the pressure is relieved by leakage of crankcase oil elsewhere within the engine, for example at the crankcase seals, dipstick seals or turbocharger seals. Such a leak may result in damage to the engine.

In order to prevent such damage, and excessive loss of oil, it is known to provide an outlet valve that allows the blow-by gas to be vented to the atmosphere. However, with increasing environmental awareness generally, and within the motor industry in particular, it is becoming unacceptable to allow blow-by gas to be vented to atmosphere due to the discharge of oil and other contaminants from within the crankcase. Furthermore, such venting increases the speed at which crankcase oil is consumed.

Consequently, it is known to filter the blow-by gas. The filtered blow-by gas may then be vented to the atmosphere as before (in an open loop system). Separated oil is returned to the sump via a drain hose. The blow-by gas may pass through a filtering medium or another known form of gas contaminant separator to remove oil, soot and other contaminants to protect engine components from fouling and any resultant reduction in performance or failure of a component. In order to avoid unacceptably high engine crankcase pressures, such a separator must not have a flow pressure differential higher than an allowable limit which is defined by the engine manufacturer in order to avoid oil leakage from the engine crankcase and other seals. Typically an upper limit of between 5 mbar and 50 mbar is set.

By returning the cleaned blow-by gas to the air intake of an engine (to form a closed loop system) it is ensured that no oil aerosols remaining after separation are vented to atmosphere. For such systems (known as Closed Crankcase Ventilation systems) the small vacuum created by the engine air intake results in the requirement for a separate pressure regulator to prevent negative pressures being translated to engine at some transient speed and load conditions.

Where cleaned blow-by gas is returned to the air intake of an engine via a turbo-charger system it is necessary to comply with the specifications for how clean the air must be from the turbo-charger manufacturer. For instance, a typical maximum oil contamination rate for turbo-chargers is 0.2 g per hour. This requirement can further increase the required separation efficiency.

The maximum gravimetric efficiency of known separators having a pressure differential within the range defined by either an open or a closed crankcase ventilation system have been measured and are known by those in the industry. Generally 70%-80% of oil aerosols can be removed by mass. The application of two separators in series, each utilising a portion of the available pressure differential has been found to yield no significant improvement in overall efficiency.

There is an increasing demand for higher separation efficiency in both open and closed loop systems. For instance, an overall oil separation efficiency of greater than 98% measured by mass (gravimetric) for particles collected using an absolute measurement filter is required by many engine manufacturers. Utilising state of the art equipment, the fractional efficiency (that is, the separation performance of the device at any given particle size) can be measured for particle sizes larger than around 0.03 μm. The particle challenge characteristics of the engine (that is, the fractional makeup of the contaminants) can similarly be measured. In some cases an efficiency requirement is given for specific particle sizes as small as 0.2 μm, which may be as high as 85%. Furthermore, emissions legislation in Europe and the US are incrementally increasing the required separation efficiency such that it will soon be necessary to achieve 99% gravimetric separation efficiencies.

Separation using filter mediums is undesirable as such filters have a finite lifespan before they become clogged and must be replaced. Engine manufacturers and end users in general prefer to only use engine components that can remain in place for the life of the engine. While fit for life separators are known, typically only powered centrifugal separators and electrostatic precipitators have hitherto been able to achieve the required levels of separation efficiency. Such separators are costly to manufacture, consume electrical power, or have moving parts which may be prone to wear. Low cost, fit for life impactor separators (where separation occurs as a contaminated gas stream is incident upon an impactor plate transverse to the gas flow) are not usually able to achieve the required separation efficiency. Impactor separators are also referred to in the art as inertial gas-liquid impactor separators. It is known to use inertial gas-liquid impactor separators in both open and closed crankcase ventilation systems. Contaminants are removed from the fluid stream by accelerating the fluid to a high velocity through a slit, nozzle or other orifice and directing the fluid stream against an impactor plate to cause a sharp directional change.

WO-2009/037496-A2 in the name Parker Hannifin (UK) Ltd discloses a separator for separating contaminants from a fluid stream. The separator comprises: a chamber, a first inlet for receiving a first fluid stream, the first inlet having a convergent nozzle for accelerating the first fluid stream and a second inlet for receiving a second fluid stream including entrained contaminants, for instance blow-by gas. The second inlet is arranged relative to the first inlet such that the first fluid stream can entrain and accelerate the second fluid stream forming a combined fluid stream within the chamber. A surface is coupled to the chamber and arranged such that the surface can cause a deviation in the course of the combined fluid stream incident upon it such that contaminants are separated from the combined fluid stream.

According to this known form of separator, contaminants can be removed from a fluid stream to a high level of efficiency without the need for driven or moving parts. The separator is suitable for separating contaminants from a gas stream such as a blow-by gas stream derived from an internal combustion engine. The first fluid stream may be derived from a turbo compressor or other source of compressed air within a vehicle engine and serves to draw the blow-by gas from the crankcase of an engine. The first fluid stream forms an area of reduced pressure in the chamber which draws in the blow-by gas. Such a separator may be a fit for life separator owing to the absence of moving parts that may fail or filter mediums that would be prone to clogging and require frequent replacement.

For separators having an impaction surface arranged to cause separation by deflecting the fluid stream, the separation efficiency can be increased by providing a nozzle through which the fluid stream passes. The nozzle causes the fluid stream to be accelerated such that the fluid stream is incident upon the impaction surface at a higher velocity. It is desirable to apply a nozzle with the smallest possible cross sectional area in order to achieve the highest velocity and separation efficiencies. An undesirable consequence of this is that there is a higher pressure drop created across the separator. In order to prevent the crankcase pressure increasing to unacceptable levels, the minimum size of the nozzle and consequently the performance of the separator is limited. To control crankcase pressure within acceptable limits a pressure regulator must also be added either upstream or downstream of the separator.

Such inertial separators as described above, having fixed section nozzles produce an air-stream having a uniform velocity across the impactor face. Due to the difference in inertia of different sized particles a characteristic fractional separation efficiency profile results with the smallest particles having significantly lower chances of successful separation compared to larger and heavier particles.

SUMMARY OF THE INVENTION

It is an object of embodiments of the present invention to obviate or mitigate one or more of the problems associated with the prior art, whether identified herein or elsewhere. Specifically, it is an object of embodiments of the present invention to provide further improvements in the efficiency of crankcase ventilation systems, in particular, fit for life closed crankcase ventilation systems (CCV systems). Certain embodiments of the present invention are not dependent upon electrical power, or complex rotating parts. It is a further object of embodiments of the present invention to provide a high efficiency separator that can prevent the fluid inlet pressure rising to unacceptable levels.

According to a first aspect of the present invention there is provided a separator for separating contaminants from a fluid stream, the separator comprising: a first inlet arranged to receive a first fluid stream including entrained contaminants; first and second separation stages coupled together in series and coupled to the first inlet to receive the first fluid stream from the first inlet and each arranged to separate contaminants from the first fluid stream; and a pump coupled to the second separation stage and arranged to generate an area of reduced pressure to draw the first fluid stream through the first and second separation stages; wherein one of the separation stages comprises a variable impactor separator comprising: a first chamber arranged to receive the first fluid stream; a second chamber coupled to the first chamber through at least one aperture arranged such that the first fluid stream is accelerated through the aperture and is incident upon an impaction surface such that contaminants are separated from the first fluid stream; and an actuator arranged to adjust the open area of the aperture, each aperture or the group of apertures according to a pressure differential between fluid pressure in the first chamber and a reference fluid pressure in a third chamber; and wherein the other of the separation stages comprises one of a second variable impactor separator and a filter media.

A feature of the present invention is that the pump generates a region of reduced pressure downstream of the impaction surface which allows for a high pressure differential to be maintained across the separator stages without causing the inlet pressure to rise to unacceptable levels. Furthermore, the variable impactor separator or at least one of the variable impactor separators ensures that the inlet pressure is maintained at a predetermined level relative to the pressure reference. Preferably the pressure reference is the ambient environment, allowing the crankcase pressure to be closely controlled at or around the ambient environmental pressure, reducing the pressure on engine seals.

Separators in accordance with embodiments of the present invention are able to achieve significantly higher rates of both gravimetric and fractional separation efficiency by dividing the available pressure drop provided by the pump across two or more separation stages compared with the performance of a single stage separator utilising the same pressure drop. This significant result is not achievable without the benefit of an external energy source in the form of a pump. At the same time the variable impactor or each variable impactor separation stage allows the separation efficiency to be maximised while providing effective pressure regulation across the separator to prevent the crankcase pressure falling below or exceeding predetermined limits. The or each variable impactor separator additionally controls the open area of the aperture according to the available pump pressure. This control over the open area of the aperture reduces or fully eliminates the effect of pump surge and high and low pressure hunting, which commonly occur with unregulated or poorly regulated pumped separators.

For the variable impactor separator or at least one of the variable impactor separators the impaction surface may be within the second chamber and is arranged to deflect the first fluid stream after the first fluid stream enters the second chamber such that contaminants are separated from the first fluid stream.

For the variable impactor separator or at least one of the variable impactor separators the shape of the aperture may be chosen such that the rate of change of the open area of the aperture has a non-linear response to a change in the pressure differential between the first and third chambers.

For the variable impactor separator or at least one of the variable impactor separators the actuator may comprise a diaphragm separating the first chamber from the third chamber.

For the variable impactor separator or at least one of the variable impactor separators the first chamber may be defined by an inner tube arranged to receive the first fluid stream at a first end of the inner tube and the second chamber is defined by an outer tube surrounding the first chamber, the second end of the inner tube being closed by the diaphragm.

For the variable impactor separator or at least one of the variable impactor separators the diaphragm may be arranged to move along a longitudinal axis of the tubes in response to a change in the pressure differential between the first chamber and the pressure reference.

For the variable impactor separator or at least one of the variable impactor separators the aperture may comprise a slot through the inner tube wall and the diaphragm may further comprise a flexible portion arranged to progressively cover and uncover the slot to vary the open size of the aperture as the diaphragm moves. In alternative embodiments the slot may be replaced by a series of discrete slots, apertures or other openings between the chambers.

The separator may further comprise a drain arranged to allow liquid contaminants to drain from the separator.

The first separation stage may comprise a variable impactor separator and the second separation stage comprises a filter media coupled between the first separation stage and the pump, the filter media comprising a pass through filter media arranged to trap a portion of contaminants entrained in the first fluid stream.

The pump may comprise a fourth chamber having a second inlet for receiving a second fluid stream into the fourth chamber, the second inlet including a convergent nozzle for accelerating the second fluid stream, and a third inlet for receiving the first fluid stream, the third inlet being arranged relative to the second inlet such that the second fluid stream can entrain and accelerate the first fluid stream. Alternatively, the pump is electrically or hydraulically driven.

The separator may further comprise a cyclonic separator coupled between the first inlet and the first separation stage, the cyclonic separator being arranged to cause fluid received from the first inlet to accelerate through a spiral course to separate contaminants from the first fluid stream.

The first separation stage may comprise a variable impactor separator and an inner tube defining the first chamber of the variable impactor separator extends downwards into the cyclonic separator to form the vortex finder of the cyclonic separator.

According to a second aspect of the present invention there is provided a crankcase ventilation system comprising: a blow-by gas duct arranged to receive blow-by gas from a crankcase; and a separator according to any one of the preceding claims, wherein the first inlet is coupled to the blow-by gas duct.

The pump may be arranged to be coupled to an engine air inlet system, to a vehicle exhaust system or to discharge gases to the ambient environment.

According to a third aspect of the present invention there is provided an internal combustion engine comprising a crankcase ventilation system as described above, wherein the second inlet is arranged to receive a pressurised gas stream derived from a turbocharger and the separator is operable to separate crankcase oil from the blow-by gas.

In a further embodiment of the present invention there is provided a separator for separating contaminants from a fluid stream, the separator comprising: a first inlet arranged to receive a first fluid stream including entrained contaminants; first and second separation stages coupled together in series and coupled to the first inlet to receive the first fluid stream from the first inlet and each arranged to separate contaminants from the first fluid stream; and a pump coupled to the second separation stage and arranged to generate an area of reduced pressure to draw the first fluid stream through the first and second separation stages; wherein one of the separation stages comprises a variable impactor separator comprising: a first chamber arranged to receive the first fluid stream; a second chamber coupled to the first chamber through an aperture arranged such that the first fluid stream is accelerated through the aperture and is incident upon an impaction surface such that contaminants are separated from the first fluid stream; and an actuator arranged to adjust the open area of the aperture according to a pressure differential between fluid pressure in the first chamber and a reference fluid pressure in a third chamber; and wherein the other of the separation stages comprises one of a second variable impactor separator, a filter media and a cyclonic filter coupled between the first inlet and the variable impactor separator.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENT

The conventional arrangement of an engine blow-by gas/oil separator returning cleaned gas to an engine air intake is commonly referred to as a closed crankcase ventilation system (CCV system). Known CCV systems require the use of a crankcase pressure regulator in order to ensure that an excessive proportion of the vacuum generated by the engine air intake is not translated via the CCV separator to the engine crankcase.

Figure 1:
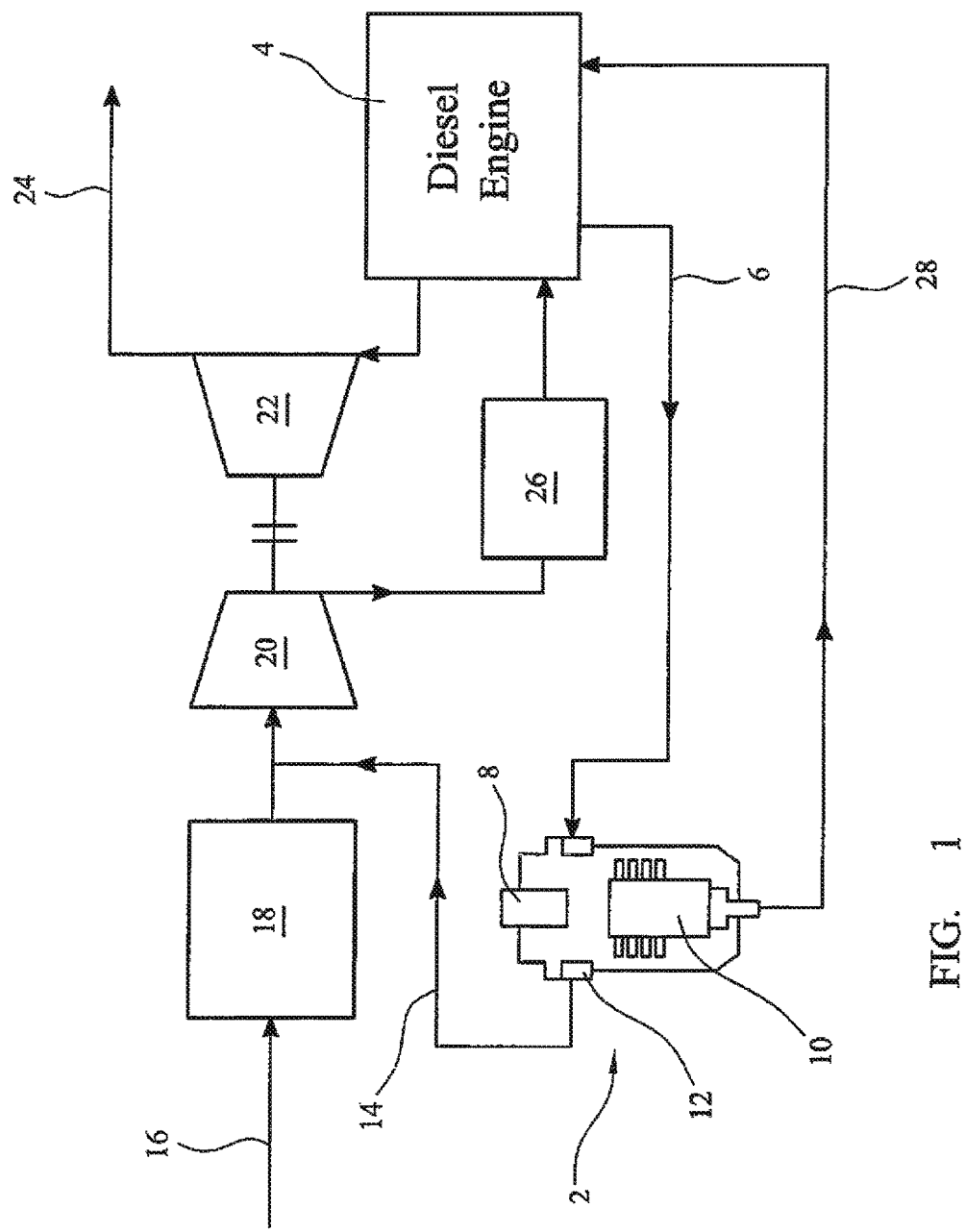
FIG. 1 schematically illustrates an engine system including a closed crankcase ventilation system.

Referring to FIG. 1, this illustrates the arrangement of a conventional CCV system 2 coupled to a diesel engine 4. Blow-by gas from the engine crankcase passes to the CCV system 2 along inlet duct 6. The CCV system 2 comprises a regulator 8 coupled to the inlet duct 6 and a contaminant separator 10 in series. The regulator 8 and separator 10 are shown combined in FIG. 1.

A pump 12 may optionally be provided within the CCV system (not separately visible in FIG. 1) to increase the pressure drop across the separator 10, thereby increasing the filtering efficiency. Cleaned blow-by gas exits the CCV system through gas outlet 14 and is returned to the engine air intake system. Specifically, the engine air intake system draws in air from outside of the vehicle through an inlet 16, the air then passing through an inlet air filter and silencer 18, a compressor 20 driven by a turbo charger 22 (in turn driven by the engine exhaust 24) and an after cooler 26 to cool the compressed air before it is supplied to the engine 4. The cleaned blow-by gas passes from the gas outlet 14 to the compressor 20. Oil and other contaminants separated from the blow-by gas are returned to the engine crankcase through oil drain 28.

In the system of FIG. 1 a portion of the vacuum generated between the turbocharger 22 and the air filter 18 is lost over the blow-by separator 10. The regulator 8 controls any remaining vacuum that would otherwise be exposed to the engine crankcase. It can be seen that the total air flow drawn by the turbo compressor 22 is not necessarily restricted by the closing of the regulator, since the difference can be drawn via the engine air filter 18.

Figure 2:
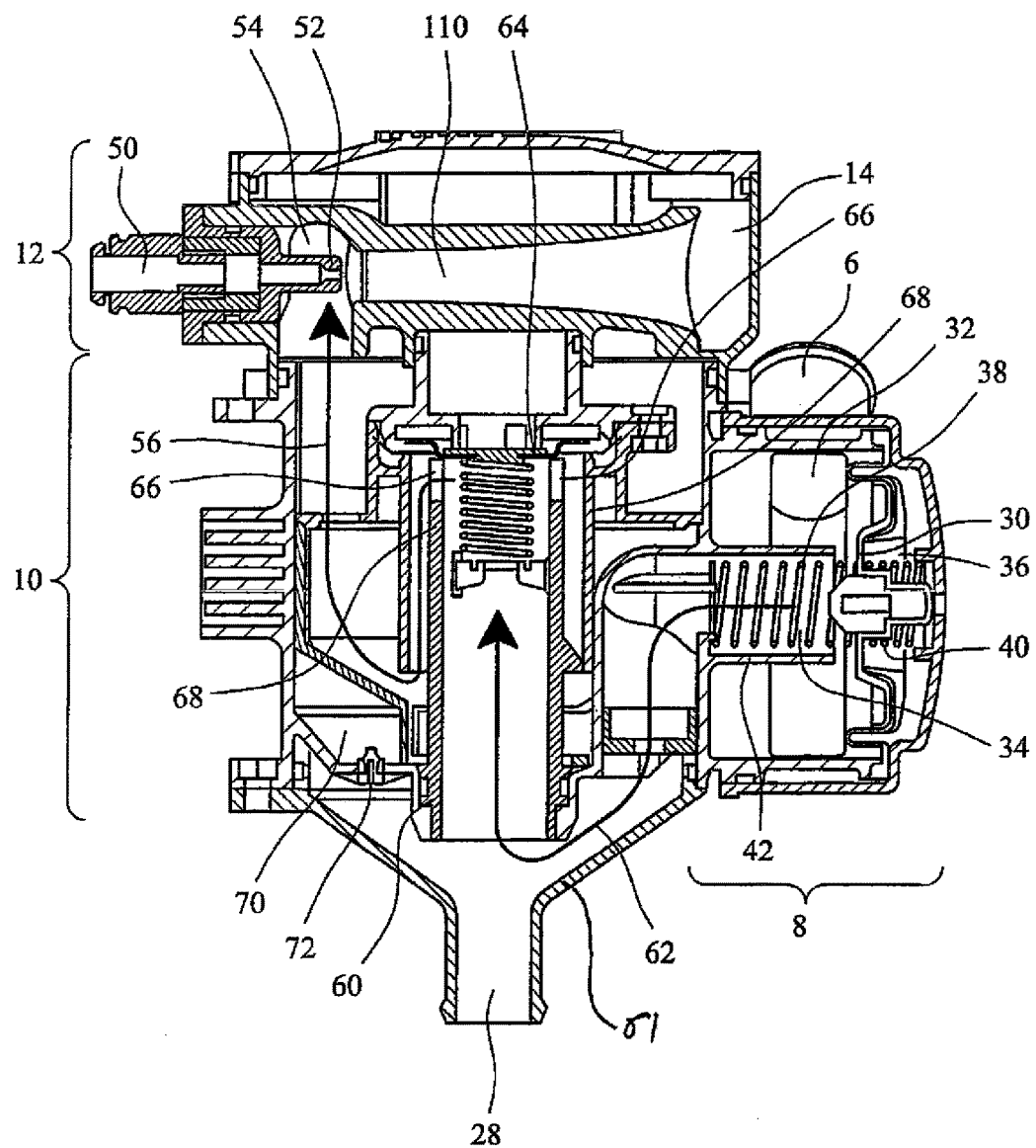
FIG. 2 illustrates in a cross sectional view a CCV system including an impactor separator arranged to have a variable response to changing crankcase pressure.

Referring now to FIG. 2, this illustrates a cross sectional view of a CCV system for separating liquid, aerosol and particulate contaminants from a blow-by gas stream. The separator comprises a variable impactor separator which is arranged to automatically adjust the size of an aperture through which the blow-by gases to optimise separation efficiency and to provide a degree of integral pressure regulation to prevent excessive pressure variation within the crankcase as the vacuum developed by a pump varies over time. The respective portions comprising a separate pressure regulator 8, a separator 10 and a pump 12 are indicated.

The regulator 8 comprises a floating diaphragm 30 which is arranged to open or close to restrict blow-by gas flow and regulate the crankcase pressure as required. Blow-by gas enters a first regulator chamber 32 through the CCV gas inlet 6. Chamber 32 is at substantially the same pressure as the engine crankcase. The diaphragm 30 at least partially occludes the gap between the first chamber 32 and a second chamber 34 (in turn coupled to the separator 10). A first side of diaphragm 30 is exposed to the blow-by gas in chamber 32. A second side of the diaphragm 30 is exposed to an ambient gas pressure within a chamber 36, which has an opening to the ambient environment. Alternatively, the third chamber 36 may be coupled to a separate pressure reference.

Movement of the diaphragm 30 is controlled by first and second springs 38, 40. Spring 38 is positioned within the second chamber and resists movement of the diaphragm 30 to close the gap between the first and second chambers 32, 34. Spring 40 is positioned within the third chamber 36 and resists movement of the diaphragm 30 to open the gap between the first and second chambers 32, 34. Adjustment of the response of springs 38, 40 and adjustment of the relative sizes of the first and second sides of the diaphragm 30 acted upon by the blow-by gas and the ambient gas pressure can be used to control the rate and extent of movement of the diaphragm 30.

Integral pump 12 improves the separation performance of the CCV system 2 by generating a larger vacuum to draw the blow-by gas through the separator 10 than the vacuum available from the compressor 20. The pressure in the first chamber 32 is regulated to the desired crankcase pressure by specification of the pump to generate the required vacuum, specifying appropriate pressure regulation spring forces within regulator 8 and by specifying the pressure response of the separator 10, as described in greater detail below. The pressure in the second chamber 34 is defined by the variable pressure loss across the separator (according to the pressure response of the separator 10) and the vacuum generated by the pump 12. The vacuum generated is determined according to the operating point along the chosen pump's flow versus pressure performance curve.

It will be appreciated that for a pumped CCV separator system the flow through the pump can be entirely restricted by the position of the regulator diaphragm. For the regulator illustrated in FIG. 2, if the diaphragm 30 comes into contact with the end of tubular wall 42 separating the first and second chambers 32, 34 then gas flow between the first and second chambers is interrupted. The effect upon the pump 12 is similar to the phenomena of pump surge in which an unregulated displacement pump can give rise to spikes in the output pressure. Restricted flow resulting from a mostly or fully closed regulator moves the pump operating point to a corresponding low flow and high vacuum position. The increased vacuum generated in the second chamber 34 further increases the force acting on the vacuum regulation springs 38, 40 and the flow of blow-by gas is restricted yet further. Only greater force acting upon the diaphragm 30 generated by a build up of positive pressure in the engine crankcase can open the regulator again. As discussed above, excessive pressure build up in a crankcase can result in damage to the crankcase and escape of oil. A closed loop control cycle of high and low pressure hunting results between the regulator and the pump which cannot be controlled with a conventional linear response regulator.

The problems of high and low pressure hunting for pumped CCV systems may also be experienced within other forms of crankcase ventilation systems. Specifically, pressure hunting may occur in open crankcase ventilation systems, non-pumped closed crankcase ventilation systems and exhaust pumped ventilation systems. More generally, the problems discussed above associated with conventional regulators may occur in any system which includes a pressure regulator.

An improved regulator which addresses the problems of high and low pressure hunting and pump surge is the subject of a separator patent application published as WO-2011/070341-A1 in the name Parker Hannifin (UK) Ltd. In accordance with certain embodiments of the present invention, the CCV system may incorporate an impactor separator which implements a similar form of pressure regulation to that disclosed in WO-2011/070341-A1.

Pump 12 serves to generate a region of low gas pressure in order to draw contaminated blow-by gases through separator 10. The pump 12 in accordance with certain embodiments of the present invention can be considered to be a type of jet pump. Similar jet pumps in combination with separators are described in WO-2009/037496-A2. A first inlet 50 to the pump 12 receives a source of pressurised gas, referred to herein as boost gas. The boost gas may be provided by the turbo charger 22 or any other source of pressurised gas such as exhaust gas. The boost gas need not be at a high velocity on entering the boost gas inlet. The boost gas could be static, though under pressure. Optionally, the boost gas could be obtained from the exhaust or the turbocharger and stored in a separate holding chamber or collector prior to being passed to the boost gas inlet.

Boost gas enters the pump via boost gas inlet 50. When used on a turbocharged engine the boost gas may be a derived from a source of pressurised gas such as the intake manifold. Alternatively, the pressurised gas could be derived directly from the turbocharger, however it is preferable to derive the air from the intake manifold as at this stage the turbocharger gas has passed through a heat exchanger (alternatively referred to as an intercooler) so that it is cooled from approximately 180-200° C. to 50-60° C. Using cooler boost gas allows the separator to be formed from lower cost materials which do not need to be resistant to such high temperatures. Alternatively, exhaust gas derived from before or after the turbocharger may be used as the boost gas. The boost gas is typically between 1 Bar absolute pressure and 4 Bar absolute pressure (up to 3 Bar above atmospheric pressure).

The boost gas passes through nozzle 52, which accelerates the boost gas (and causes a consequent reduction in pressure). The nozzle 52 is formed as a convergent nozzle. In particular, the nozzle may be a convergent-divergent nozzle, such as a de-Lavaal nozzle, which is well known in the art. Other suitable nozzle shapes are known, including any nozzle having a restricted central portion. The boost gas is accelerated to a high velocity, for instance between 100-500 $m \cdot s^{-1}$, with the boost gas typically exceeding mach 1 at least in the region of nozzle 52. A convergent nozzle advantageously accelerates the boost gas to very high speeds, which consequently entrains the blow-by gas and accelerates the blow-by gas to high speeds. The nozzle is arranged to generate a region of reduced pressure to draw in the blow-by gas.

The resultant high speed boost gas jet passes into chamber 54. The high velocity boost gas jet causes a region of reduced pressure within the chamber 54 in the vicinity of the nozzle 52. Pressure is reduced by up to 300 mBar relative to external atmospheric pressure. This magnitude of available pressure reduction is required to accommodate a significant increase in blow-by gas flow rates as the engine wears relative to the performance of a new engine. As components of the engine wear, in particular the piston seals, increasing the rate of production of blow-by gas, the variable impactor separator increases the open area of the aperture to allow a larger volume of blow-by gas to pass through thereby maintaining the pressure within the crankcase to within predetermined limits. The effect is that for a worn engine the pressure reduction within chamber 54 relative to the external atmospheric pressure may be lowered to around 150 mBar. This reduction in pressure allows cleaned blow-by gas from the separator 10 to be drawn into chamber 54. The passage of the blow-by gas from regulator 8 through separator 10 is described below. Blow-by gas is sucked into chamber 54. The blow-by gas flow is entrained and accelerated by the boost gas, intermixing with the boost gas and accelerating to approach the speed of the boost gas.

The boost gas nozzle 52 and the annular blow-by gas inlet 54 are generally constructed in the form of a jet pump, as is known in the art. The combined gas stream passes into a diffuser tube 110. In order to achieve satisfactory entrainment and acceleration of the blow-by gas, preferably the diameter of the diffuser tube 110 should be between 2 to 5 times greater, preferably 3 to 4 times greater, than the critical diameter (typically, the smallest diameter) of boost gas nozzle 52. The position of the critical diameter (alternatively referred to as the throat of the nozzle) may vary from the narrowest point of the nozzle due to aerodynamic effects, as is known in the art of nozzle design.

The diffuser tube is generally formed as a cylinder; however the side walls are not necessarily straight for the whole of their length. The side walls may taper outwardly towards the end of the tube remote from nozzle 52. This tapering assists in controlling the direction of flow and mixing of the combined gas flow.

The contaminated blow-by gas is actively drawn out of the crankcase and through the separator allowing for control of the crankcase pressure. The pressure within the crankcase is typically controlled to within +/−50 mBar relative to external atmospheric pressure, with the pressure differential to atmospheric pressure controlled by the regulator 8 as described above. The pressure drop from the crankcase pressure in chamber 32 to the low pressure in chamber 54 allows for higher efficiency separation within separator 10, as described below.

It will be appreciated that although the primary form of pump described in the present specification is a jet pump as shown in FIG. 2, other known forms of pump such as electric pumps may be used in order to achieve the required pressure drop across separator 10. The pressure drop across the separator 10 generated by the pump 12 overcomes the high pressure differential of the separator 10 without causing an excessively high crankcase pressure. That is, because of the reduction in pressure caused by the pump 12, the blow-by gas may be drawn through a smaller impaction gap causing more efficient separation.

After the blow-by gas passes through regulator 8 into chamber 34, the gas is drawn into the separator inlet tube 60 via a cyclonic pre-separator 61 generally along the path indicated by arrow 62. The cyclonic pre-separator 61 is generally conical and the blow-by gas enters via an inlet from the regulator 8 towards one side of the cyclone. The separator inlet tube 60 projects downwards into the cyclone 61 and serves as the vortex finder for the cyclone. The cyclonic airflow causes contaminants to be impacted against the walls of the cyclone 61 and a proportion of the contaminants is separated from the blow-by gas and flows downwards towards oil drain 28 while the blow-by gas is drawn up through the inlet tube 60.

The separator inlet tube 60 is partially closed at its upper end by diaphragm 64. The blow-by gas then passes through one or more slots 66 and is incident upon an annular impaction surface 68. Oil and other contaminants separated from the blow-by gas at impaction surface 68 flow under gravity to oil sump 70 surrounding the separator inlet tube 60 and then to oil drain 28 through check valve 72 into the cyclone 61 and downwards along the sides of the cyclone 61. Additionally, oil which is already separated from the blow-by gas within regulator 8 can also flow to oil sump 70. Oil from drain 28 is returned to the crankcase.

Figure 3:
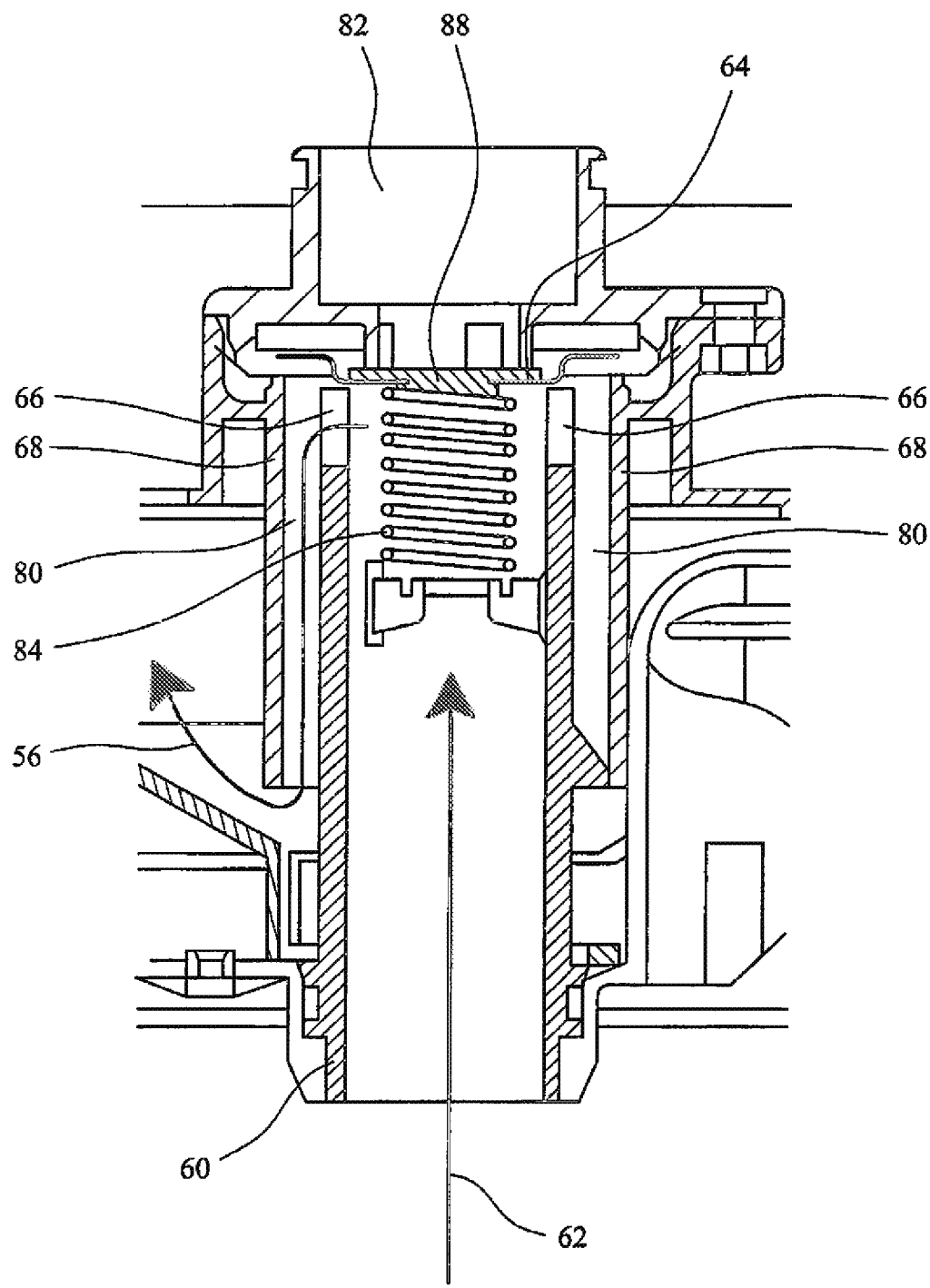
FIG. 3 is an enlarged cross sectional view of the CCV system impactor separator of FIG. 2.

The separator 10 may be considered to be a variable impactor separator as it is intended to respond to differences between the blow-by gas inlet pressure and the outlet pressure to increase the separation efficiency, as will now be described with reference to FIG. 3.

Contaminated engine crankcase blow-by gases enter the separator inlet tube 60 along the path of arrow 62. The upper end of inlet tube 60 is separated from an annular impaction chamber 80 by diaphragm 64. Diaphragm 64 may form a radial seal with the upper end of tube 60 as it moves towards or away from the upper end of tube 60 or the diaphragm 64 may be arranged to never fully make contact with tube 60. Diaphragm 64 also separates the inside of tube 60 from chamber 82. Chamber 82 is kept at atmospheric pressure by an air inlet (not shown) which connects to the outside of the CCV system. The inside of tube 60 is at substantially the same pressure as the engine crankcase, allowing for any difference in pressure across regulator 8.

Figure 4:
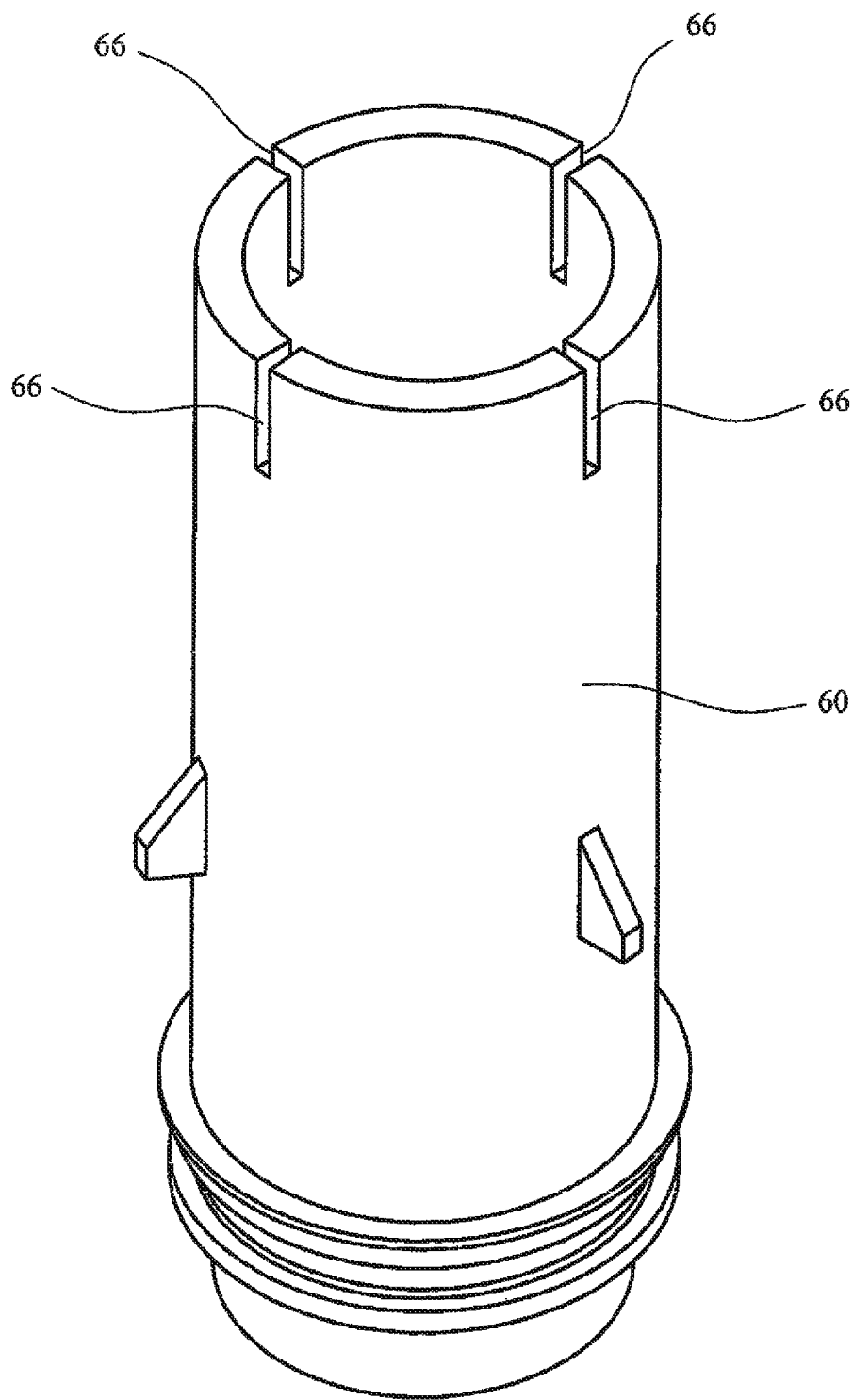
FIG. 4 is a perspective view of the impactor tube of FIG. 2.

Blow-by gas passes into the impaction chamber 80 through one or more vertical slots 66 which are open at the upper end of the tube. The form of slots 66 can be more clearly understood through the perspective view of FIG. 4. The size and number of slots 66 determines the minimum differential pressure drop across the variable impactor separator system. This pressure drop is directly related to the separation efficiency of the CCV system. Impaction and separation of oil particles due to radial acceleration in making a 180° turn occurs both on the diaphragm face and the impaction surface 68. The impaction surface may be covered with a material opposite the slots 66 to improve the co-efficient of restitution of oil droplets on the outer walls, rather than act as a pass through media. The media covering the impaction surface serves to reduce re-entrainment of the contaminants Oil separated from the blow-by gas at the impaction surface 68 then flows under gravity to the oil sump 70 and ultimately to oil drain 28 as described above.

The gas stream flows downwardly towards the sump after being deflected by the impaction surface. It is then diverted to flow upwardly by means of a baffle, as indicated in FIG. 2 by the arrow 56. The baffle is shown in FIG. 2 being inclined upwardly towards the outer wall of the filter with a drain for oil at the inner edge of the baffle, close to the wall of the separator inlet tube 60. It can be preferable for the baffle to be inclined downwardly towards the outer wall of the filter, with a drain for oil towards the outer edge of the baffle close to external wall of the housing. In this way, the gas stream flowing over the baffle can help to encourage oil on the surface of the baffle to flow outwardly towards the drain, to drain into the sump.

The jet pump 12 connected downstream of impaction chamber 80 is used to overcome the pressure drop of the variable impactor separator. The separation performance achievable is therefore no longer limited as with conventional un-powered impactor systems. At the same time an acceptable crankcase pressure close to atmospheric pressure can be maintained.

As the engine load, speed or engine braking conditions change both the vacuum generated by the jet pump 12, and the volume of blow-by gas passing through the separator 10 change. To maintain an acceptable crankcase pressure according to the variable vacuum conditions generated by the jet pump 12, the diaphragm 64 is allowed to open and close the gap between the top of the tube 60 and the diaphragm 64 above the open ends of the slots 66. The chamber 82 is kept at atmospheric pressure such that any net positive pressure on the diaphragm will cause it to open creating or widening an annular gap above the end of tube 60, which reduces the pressure drop across the separator 10. As soon as a net vacuum is generated by the jet pump the diaphragm fully closes (which as noted above may cause the diaphragm 64 to contact the top of the tube, or a gap may be preserved), ensuring that the separator 10 is operating at maximum separation efficiency. The pressure differential of the separator 10 is adjusted and crankcase pressure can be regulated precisely according to the specification of the regulation spring 84. Spring 84 extends between supports 86 within tube 60 and the diaphragm 64, to which it is attached at central part 88. Additionally a second regulation spring may be provided in chamber 82 to act upon the opposite side of diaphragm 64 to control positive pressures.

The CCV system described above in accordance with FIGS. 2 to 4 incorporates a pressure regulator 8 arranged to control the crankcase pressure and an impactor separator 10. Alternatively, the separator 10 may be provided with one or more slots 66 which are shaped to provide an appropriate variation in open cross sectional area according to the pressure differential between the blow-by gas pressure and atmospheric pressure, which is achieved by having a slot with a specifically chosen cross sectional area. This may in addition to, or as a complete replacement to, the pressure regulator 8. A separator 10 incorporating such a variable slot is shown in FIG. 5.

Figure 5:
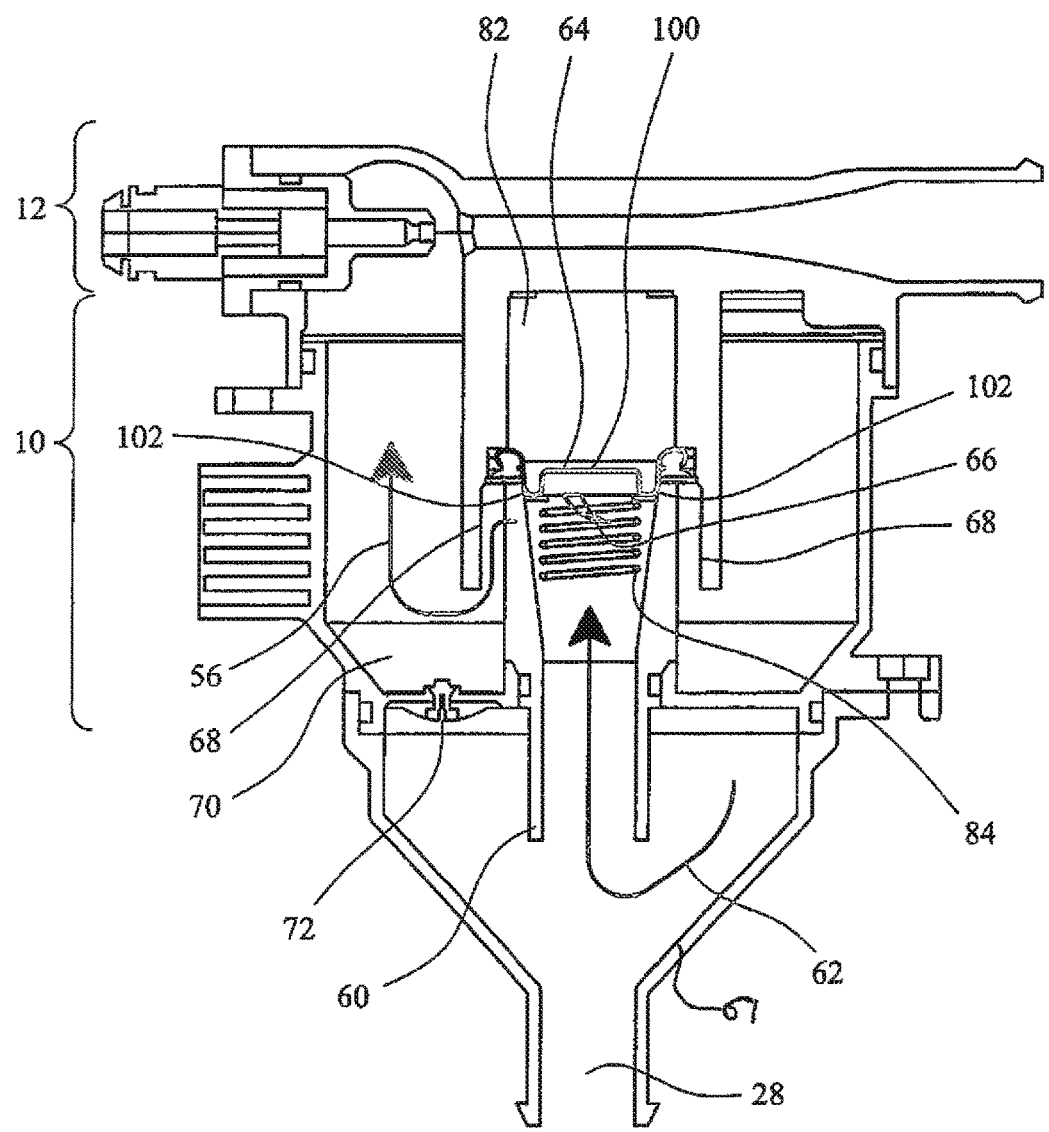
FIG. 5 is a cross sectional view of an alternative CCV system impactor separator.

FIG. 5 shows a separator 10 incorporating the function of an anti pump-surge regulator within a variable impactor separator. The diaphragm 64 comprises a rolling diaphragm, which is used to precisely adjust the aperture of a variable slot profile to regulate crankcase pressure and control the phenomenon of pump surge. Specifically, the diaphragm 64 comprises a central portion 100 arranged to couple to regulator spring 84. As for the embodiment of FIGS. 2 and 3 there may be a second regulator spring within atmospheric reference chamber 80. The diaphragm 64 further comprises an annular rolling portion 102, alternatively referred to as a rolling convolute, which progressively covers and uncovers slot 66 as the central portion 100 moves up and down. As in FIG. 2, the separator of FIG. 5 incorporates a pre-cyclone separator 61 which separates out a portion of the contaminants within the blow-by gas before it reaches the variable impactor separator. As for the separator of FIG. 2, the blow-by gas enters the cyclone 61 via an inlet towards one side of the cyclone 61 and the separator inlet tube 60 projects downwards into the cyclone 61 to serve as a cyclone vortex finder such that the blow-by gas flows to inlet tube 60 generally along the path of arrow 62.

The rolling diaphragm 64 can be used to optimise the performance of the impactor separator 10 according to the available vacuum pressure from pump 12. As the available vacuum increases, the diaphragm 12 closes, thus increasing velocity, separation performance and pressure differential across the impactor 10 until atmospheric pressure is equalised by the inlet pressure to the separator. Slot 66 generally comprises a tapering slot, which may be curved as shown. Towards the diaphragm 64, slot 66 broadens significantly so as to provide for a large flow of blow-by gas in the event of a reduction in the available vacuum from pump 12, thereby preventing the crankcase pressure rising unacceptably.

Figure 6:
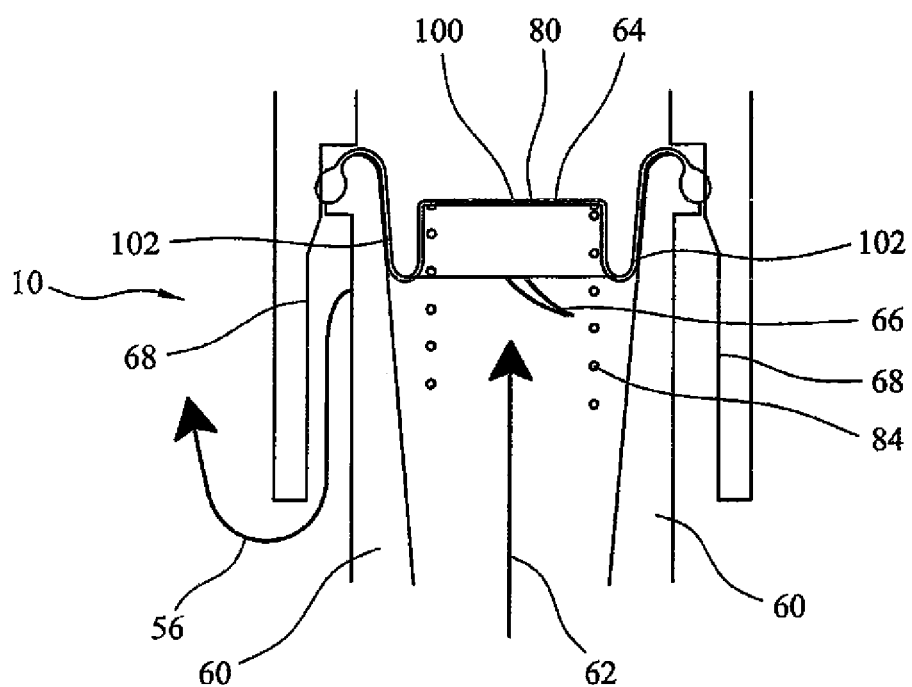
FIG. 6 is an enlarged cross sectional view of a diaphragm forming part of the CCV system impactor separator of FIG. 5 in a closed position.
Figure 7:
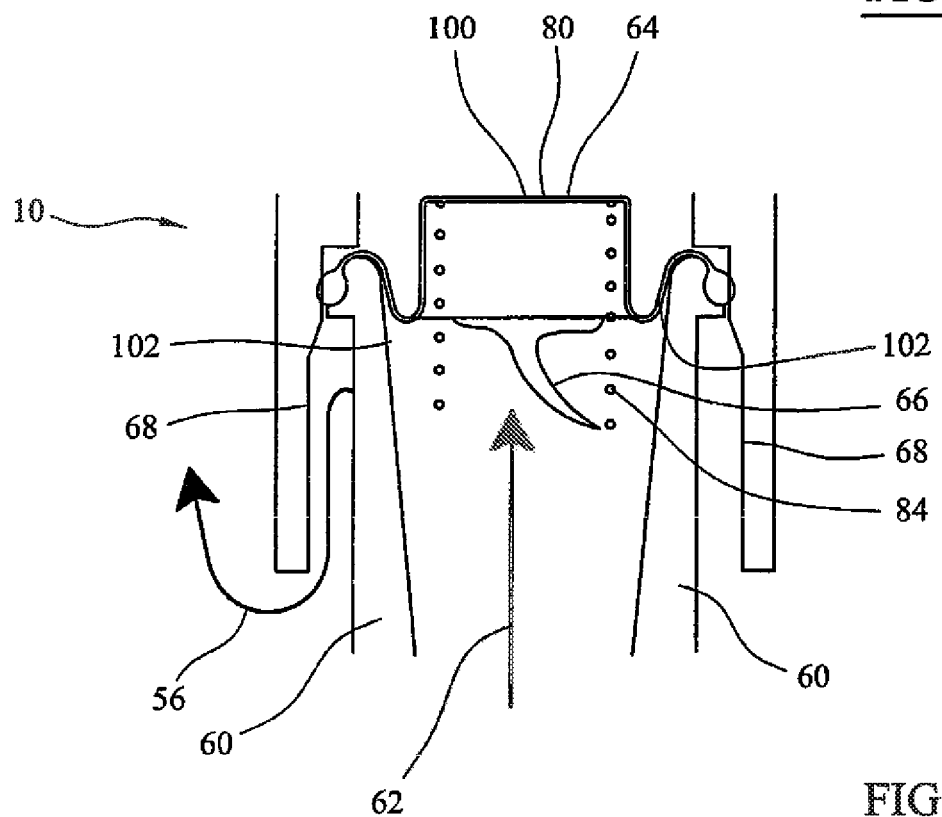
FIG. 7 is an enlarged cross sectional view of a diaphragm forming part of the CCV system impactor separator of FIG. 5 in an open position.

FIG. 6 shows the diaphragm 64 in a generally closed position, although it will be appreciated that the diaphragm may move further downwards. Only the bottom, narrow portion of the slot is exposed and available for gas to flow through. In FIG. 7 the diaphragm 64 in an almost fully open position, although it will be appreciated that the diaphragm may move further upwards. A greater proportion of the slot is exposed, including the broader upper part, and available for gas to flow through. When fully uncovered the slot 66 can be seen to have a narrow, tapering lower part and a significantly broader upper part. The narrow portion of slot 66 is intended to produce the precise pressure control function required to counter pump-surge conditions. When the diaphragm 64 is lowered, the minimal open area gives a high pressure differential across the separator 10 and optimal impactor performance for the available pump vacuum. When the diaphragm 64 is raised, the large upper area of slot 66 is matched to regulate crankcase pressure under high flow conditions, such as may be experienced in a worn engine or under engine braking. The diaphragm may be arranged to fully cover the slot 66 at the furthest extent of its downward movement, or to ensure that at least part of the slot remains open. Adjustment of the response of the or each spring and adjustment of the relative sizes of the first and second sides of the diaphragm 64 acted upon by the blow-by gas, the ambient gas pressure and the pump vacuum can be used to control the rate and extent of movement of diaphragm 64.

Slot 66 comprises a variable section impactor slot. The varying open area of slot 66 exposed by the diaphragm as it moves has benefits both in terms of the separation of particles from the blow-by gas stream and also for control of crank case pressure. The blow-by gas stream includes a range of particle sizes travelling at the same velocity but having different momentums due to their different sizes and masses. Heavy particles with a high momentum exit towards the top of the tube through the wider part of the slot. Lighter particles exit the tube lower down the slot. As the slot is smaller at the bottom, lighter particles are accelerated to a higher velocity, thereby increasing their momentum. Advantageously, this reduces the difference in momentum between small and large particles which allows for a reduction in the difference in separation efficiency between small and large particles without restricting the aperture size (which would cause an increase in crankcase pressure).

Furthermore, the variable section impactor slot improves the pressure control across the separator. When the diaphragm is raised and the wide upper section of the slot is exposed, this allows for a large aperture size which is able to accommodate high volume blow-by gas conditions while maintaining the pressure differential across the separator (and hence the inlet pressure of the blow-by gas and the crankcase pressure) within acceptable limits. When the diaphragm lowers under low flow conditions, the decreased open area of the lower section of the slot increases the pressure differential across the separator, thereby preventing negative pressures being generated in the crankcase (relative to atmospheric pressure). The changing cross-sectional area of the aperture provides a non-linear pressure differential response for a linear movement of the diaphragm, which allows for improved, and controllable, regulation of the pressure differential across the separator.

Movement of the diaphragm 64 ensures that the available pressure drop provided by the pump is used efficiently to achieve contaminant separation without causing the crankcase pressure to fall below predetermined limits. This is an improvement over the separator of FIG. 3 for which the open area of the aperture does not change as rapidly. The effect for the separator of FIG. 3 is that a portion of the vacuum generated by the pump purges through the aperture, which requires a separate regulator to control the crankcase pressure. The improvement in pressure control provided by the separator of FIGS. 5 to 7 allows the separate pressure regulator at the blow-by gas inlet to the CCV system to be omitted in certain embodiments. It will be appreciated that the precise shape of the slot may vary widely. For instance, the slot may be helical extending around the tube 80. The helical slot may be generally constant width over at least part of its length before tapering at its closed end in order to provide an appropriate non-linear response in the cross-sectional area of the aperture for a given movement of the diaphragm. In alternative embodiments in place of one or more slots extending upwards along the tube there may be a number of separate closed apertures through the wall of the tube that are covered or uncovered by the diaphragm. For instance, in place of a helical slot there may be a line of apertures arranged along a helix. The size of the apertures may vary along the length of the helix.

The diaphragm 64 comprises an actuator arranged to control the flow of blow-by gas through slot 66. Slot 66 is cut into the tubular wall 60. The slot 66, in combination with the tubular structure 60 defines an open area through which blow-by gas can flow. The shape of the slot 66 is arranged to ensure that the pressure differential across the slot is appropriate for the flow-rate and vacuum characteristics generated by the pump. By controlling the shape of slot 66 a linear or non linear relationship between any change in pump vacuum, atmospheric pressure and crankcase pressure and the corresponding distance traveled by the diaphragm can be achieved. More specifically, the shape of the slot 66 can be chosen such that movement of the diaphragm 64 at a constant rate causes a non-linear response in the open area of the slot. Effectively any closed loop control function can be generated by the diaphragm 64 in response to a given input from the pump. More accurate crankcase pressure regulation can be achieved than for conventional arrangements of separators and regulators. Moreover, because regulation of the crankcase pressure is combined with the separator there may be no need to provide an additional pressure regulator. The separation efficiency is increased by accurately controlling the flow of the blow-by gas.

It can be seen that for the slot 66 of FIG. 5, as diaphragm 64 moves downwards, the rate of reduction of the open area of the slot increases. This is because the slot 66 tapers towards its closed end. Movement of diaphragm 64 may be limited to ensure that the open area is never completely closed off.

It will be readily apparent to the appropriately skilled person that the shape of the slot 66 may vary significantly in order to achieve the desired closed loop control function. For instance, the slot may broaden towards its closed end, be of constant width or initially taper and terminate with an enlarged portion to prevent full closure of the open area. Furthermore, multiple slots of different sizes and shapes may be provided around the tubular wall. It will be further apparent that the way in which movement of the diaphragm 64 covers and uncovers the slot may vary, and alternatives to the rolling convolute will be apparent to the skilled person and fall within the scope of certain of the appended claims. Where the claims of the present invention specify variable impactor separation stages this should be considered to cover any variable separator incorporating a regulator in which a first chamber and a second chamber are coupled together by one or more slots and the open area of the or each slot is arranged to be varied according to the position of a diaphragm or other moveable actuator which adjusts its position according to a pressure differential between gas in the first and/or second chambers and an external pressure reference.

Variable separators have been primarily described herein in use as part of a CCV system. However, it will be readily apparent to the appropriately skilled person that they may be more widely applicable. More generally, such a separator may be used in any application in which it is necessary to filter contaminants from a fluid stream and desirable to regulate a pressure drop for a fluid between a first chamber and a second chamber, with reference to an external pressure. Typically, the fluid will be a gas. Separators according to the present invention are of particular benefit in pumped systems in order to obviate or mitigate the effects of pump surge and pressure hunting described above.

Separators as described above have been observed to provide gravimetric separation efficiency in the range 95-98%. Such separators may be adapted to filter contaminants from blow-by gas in a closed loop system typically operating with a flow of blow-by gas of 50-1500 l/min. The flow of boost gas through nozzle 52 when using boost gas derived from the turbocharger of an engine typically comprises less than 1% of the total engine gas flow, so as to have a negligible effect on engine performance.

The inventors of the present application have identified that it is possible to obtain further improvements in the separation efficiency by using multiple separation stages in which at least one separation stage comprises a variable impactor separator as described above in combination with a pump. It is known that for separators without an external source of energy in the form of a pump there is no significant increase in separation efficiency by coupling together separators in series. However, it has been identified by the inventors of the present invention that by providing a pump, for instance a jet pump, to draw blow-by gas through the separator it is possible to use multiple separation stages to increase the gravimetric separation efficiency to a required level to meet the challenge posed by stringent emissions legislation while simultaneously minimising pump power consumption. Multiple powered variable impactor separators coupled together in series, or a powered variable impactor separator in series with a filter media can be specifically designed to yield higher gravimetric efficiency than a single stage variable impactor separator driven by a pump of the same power, while maintaining crankcase pressure within acceptable limits. Without the additional motive power provided by a pump it has been found that the a series of impactors coupled in series are unable to yield the required improvement in gravimetric separation efficiency when applied to the separation of diesel engine blow-by aerosols. The application of a pump allows the fractional separation efficiency of each separation stage to be optimised to the specifics of an engine's aerosol challenge distribution to bring about an overall improvement in gravimetric separation efficiency.

The fractional separation efficiency of a separator is the separation efficiency measured as a function of particle size. For a multi-stage separator the required fractional separation efficiency for each separation stage can be compared with the equivalent fractional separation efficiency of a single stage impactor to achieve the same gravimetric efficiency for a particular particle challenge distribution (that is for a given distribution of particle sizes in the blow-by gas). For a pumped separator providing an overall differential of, for instance, 100 mBar the required fractional separation efficiency to meet the particle challenge posed by the blow-by gas for a single 100 mBar variable impactor of the type illustrated above can be calculated. The required fractional separation efficiency for two 50 mBar variable impactor separators coupled in series can be calculated. The present inventors have identified that the required fractional separation efficiency for each 50 mBar variable impactor separator is comparable with or lower than the fractional separation efficiency which has been measured for a 50 mBar variable impactor separator constructed in accordance with FIGS. 2 to 7 described above. That is, by splitting the available pressure differential available from the pump across two separation stages instead of a single separator the gravimetric separation efficiency may be improved, for instance from 95% to over 99%. Dependent upon the prevailing engine conditions (including the volume of blow-by gas produced and the composition of contaminants within the blow-by gas) the gravimetric separation efficiency may approach 100%. This significant, and hitherto unidentified, result allows for yet higher fractional separation efficiencies and overall gravimetric efficiencies to be achieved using that same techniques for constructing variable impactor separators described above. A more detailed mathematical explanation of how a multi-stage separator can provide this improvement is given below in connection with FIGS. 10 to 15.

Figure 8:
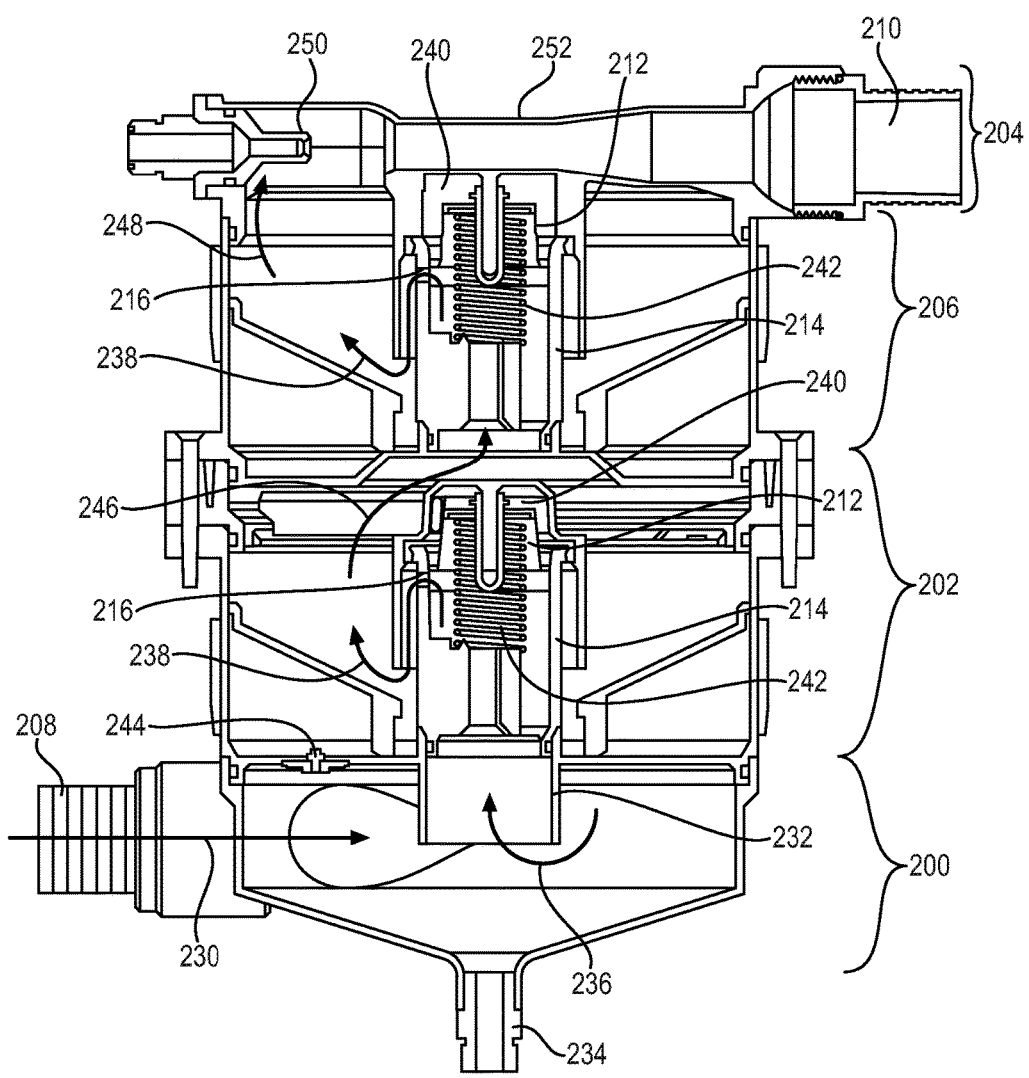
FIG. 8 illustrates in a cross sectional view a CCV separator in accordance with a first embodiment of the present invention including first and second stage impactor separators each of which is arranged to have a variable response to changing crankcase pressure.
Figure 9:
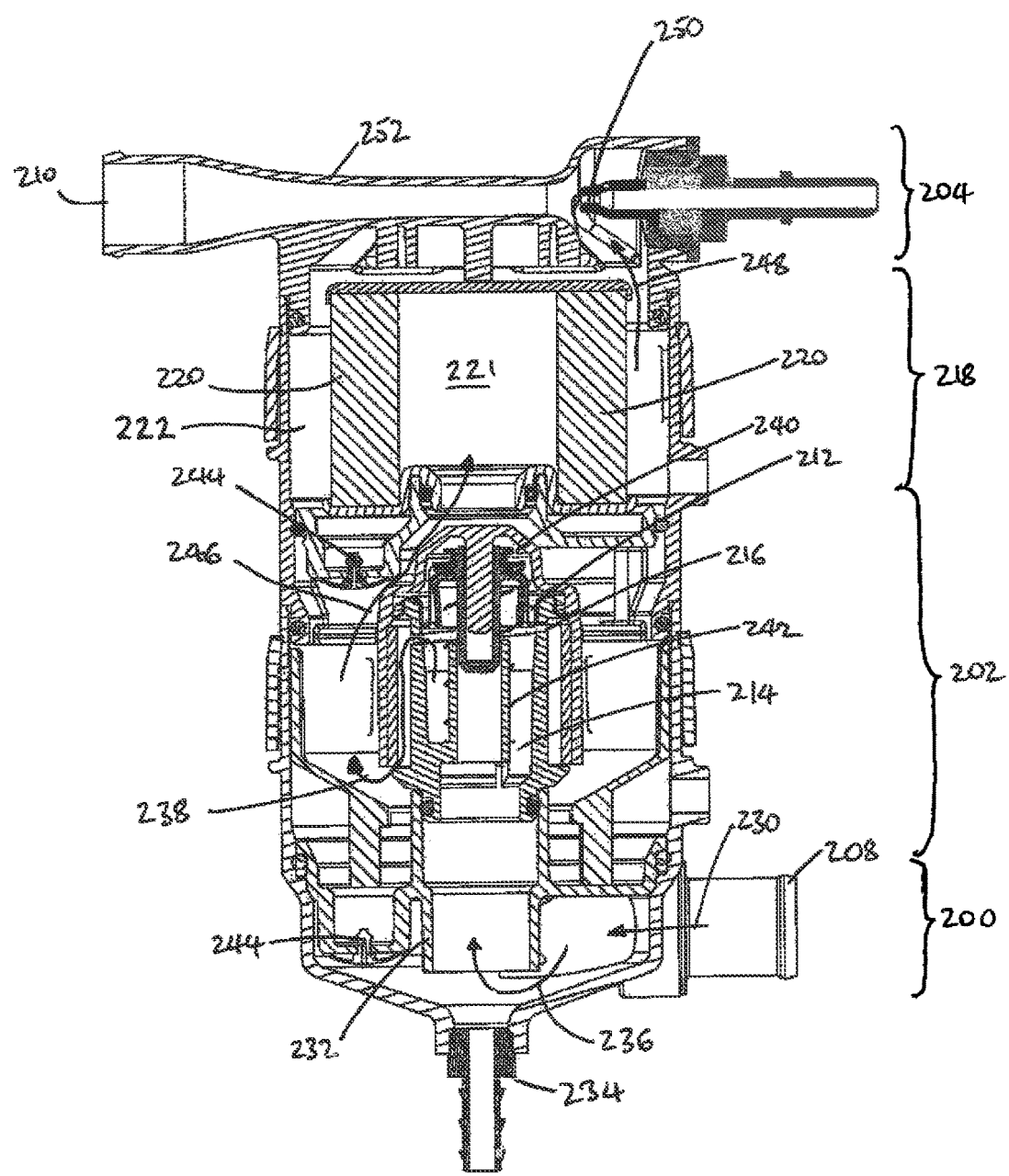
FIG. 9 illustrates in a cross sectional view a CCV separator in accordance with a second embodiment of the present invention including a first stage impactor separator arranged to have a variable response to changing crankcase pressure and a second stage media separator.

In accordance with embodiments of the present invention a variable impactor separator as illustrated in FIGS. 2 to 7 may be combined with a second separation stage (and optionally more than one additional separation stage). The second separation stage may be a second similar variable impactor separator, as illustrated in FIG. 8. Alternatively, the second separation stage may be a media separator as illustrated in FIG. 9. In either scenario the two or more stage separator may also incorporate a pre-cyclone of the sort illustrated in FIGS. 2 and 5.

Referring to FIG. 8, this illustrates a separator in accordance with a first embodiment of the invention. The separator comprises a cyclonic pre-filter 200, a first variable impactor separation stage 202 and an eductor pump 204 each of which is generally the same as the cyclonic pre-filter 61, separator 10 and jet pump 12 of FIG. 5 and so will not be fully described again here. However, differing from the separator of FIG. 5, between the first variable impactor separation stage 202 and the jet pump 204 is a second variable impactor separation stage 206. The second variable impactor separation stage 206 which is generally the same as the first variable impactor separation stage 202, however it may be optimised to further increase the overall fractional and gravimetric separation efficiencies by the use of springs having different spring response rates. In particular, the spring response rate for the springs in the second stage 206 may be chosen to allow a portion of the vacuum generated by the jet pump 204 to purge through the second stage 206 to allow the split of the available pressure differential generated by the vacuum between the two separation stages to be fine tuned to adjust the fractional separation efficiency of each separation stage in order to optimise the overall gravimetric separation efficiency. Blow-by gas is drawn through the separator by the jet pump 204 such that the blow-by gas passes from inlet 208 sequentially through the cyclonic pre-filter 200 and the first and second variable impactor stages 202, 206 before being discharged through gas outlet 210.

As for the separator of FIG. 5, each variable impactor separator stage 202, 206 incorporates the function of an anti pump-surge regulator within an impactor separator. Each separator stage 202, 206 is functionally equivalent to the separator of FIG. 5, being based upon a rolling diaphragm 212, which is used to precisely adjust the aperture of a variable slot profile to regulate crankcase pressure and maximise separation efficiency according to the available vacuum pressure from pump 204 to vary the open area of an aperture between the inside of tube 214 and the annular chamber surrounding tube 214. The diaphragm 212 continually matches the impactor pressure drop to the transient vacuum conditions generated by the jet pump 204. However, the shape of the slot 216, which in combination with the diaphragm 212 defines the aperture for each separation stage, differs from that shown in FIG. 5. Specifically, each slot 216 is helically wound around at least part of tube 214 such that movement of diaphragm 212 along the axis of tube 60 results in a more rapid change in the open area of the aperture. As for the slot 66 of FIG. 5, the slot 216 in each variable impactor separator 202, 206 is preferably tapered towards its closed end to allow for a non-linear change in the open area of the aperture for a linear rate of change of the position of diaphragm 212 and a linear rate of change of the pressure differential across each diaphragm 212. This provides smooth crankcase pressure control and avoids pump surge and pressure hunting across the separator, particularly when a jet pump it used. A further advantage is that because crankcase pressure regulation is integrated into the separator, it is not necessary to provide a separate regulator component.

The shape of each slot 216 is arranged to provide an appropriate response to changes in inlet and outlet pressure across each separation stage. It will be appreciated that shape of the slots 216 may differ between the two separation stages 202, 206. The shape of the slots 216 may vary widely from those shown in FIGS. 5 to 8. Furthermore, the spring response rate of the or each spring and adjustment of the relative sizes of the first and second sides of the diaphragms 212 acted upon by the blow-by gas and the ambient gas pressure can be used to separately control the rate and extent of movement of each diaphragm 212.

The variable impactor separator slots 216 improve the pressure control across each separation stage 202, 206. When the diaphragms 212 are raised and the size of the apertures increases, this allows for a large aperture size which is able to accommodate high volume blow-by gas conditions while maintaining the pressure differential across the separator (and hence the inlet pressure of the blow-by gas and the crankcase pressure) within acceptable limits. When the diaphragms lower, the decreased open area of the lower section of the slots increases the pressure differential across the separator, thereby preventing negative pressures being generated in the crankcase (relative to atmospheric pressure). The changing cross-sectional area of the aperture can be used, if required, to provide a non-linear pressure differential response for a linear movement of the diaphragm, which allows for improved, and controllable, regulation of the pressure differential across the separator. The improvement in pressure differential allows the separate pressure regulator at the blow-by gas inlet to the CCV system to be omitted in certain embodiments of the present invention.

Advantageously, the use of a pump such as the jet pump 204 illustrated in FIG. 8 raises the fractional efficiency of each stage of a multi-pass impaction separator to a level at which there is an overall improvement in gravimetric efficiency. Furthermore, by appropriate control of each separation stage the fractional separation efficiency of the separator can be tailored to the specific oil particle size distribution within the blow-by gas received from any given engine.

Blow-by gas passes through the separator of FIG. 8 as follows: Blow by gas enters through inlet 208, which is coupled to the crankcase of the engine. The gas passes into the cyclonic pre-filter 200 along the path of arrow 230 where it forms a cyclone spiralling about the vortex finder 232 which forms the base of the inlet tube 214 of the first variable impactor separation stage 202. A proportion of the contaminants are shed upon the wall of the cyclonic pre-filter 200 and flows downwards to oil drain 234 as the gas flows upwards through inlet tube 214 along the path of arrow 236. The blow-by gas passes through each variable impactor separation stage 202, 206 in the same way as described above in connection with FIGS. 5 to 7 passing upwards through the inlet tube 214, through slot 216 and back down through the annular chamber surrounding the inlet tube 214 and defined by a concentric outer tube generally along the path of arrow 238. Separation of oil and other contaminants occurs as the gas is accelerated through slot 216 and impacts against an impaction surface formed within the annular chamber. A coalescing media may be provided on the impaction surface to reduce the rate of re-entrainment of contaminants. The coalescing media reduces the tendency of particulate contaminants to bounce off the impaction surface.

The open area of each slot 216 is determined by the position of each diaphragm 212 according the differential pressure across the diaphragm between the inside of tube 214 and the pressure reference in chamber 240. Each chamber 240 may be coupled to the ambient environment or may be coupled to any other reference gas pressure. Additionally movement of the diaphragms 212 is controlled by the spring response rates of springs 242, which may differ from one another. Springs may also be provided coupled to the diaphragm within chamber 240 in addition to springs 242 or in place of springs 242. In some embodiments no springs are required at all. Oil separated from the blow-by gas flows downwards and passes through check valves 244 towards the oil drain 234. The cleaned gas is directed upwards generally along the path of arrow 246 from the first separation stage 202 to the second separation stage 206. After the second separation stage 206 the clean gas is directed upwards generally along the path of arrow 248 to the jet pump 204 where it is accelerated by the boost gas which enters the jet pump 204 through nozzle 250. The boost gas and the cleaned blow by gas exit the jet pump 204 through diffuser tube 252.

As noted above, the multi-stage separator of FIG. 8 also includes a cyclonic pre-filter 200, however it will be understood that in alternative embodiments this may be omitted. Additionally, while the separator of FIG. 8 incorporates two variable impactor separator stages providing inertial impaction, it will be appreciated that further variable impactor separator stages may be provided with each stage operating within a proportion of the overall pressure differential across the separator provided by the jet pump.

Referring to FIG. 9, this illustrates a separator in accordance with a second embodiment of the present invention. The separator is generally the same as that shown in FIG. 8 except that the second variable impactor separator stage 206 has been replaced by a filter media separation stage 218 including filter media 220 with an interior chamber 221 and an exterior chamber 222. This combination of inertial impaction within the variable impactor separator 202 (and also within the cyclonic pre-filter if present) followed by fibrous depth filtration has shown to provide exceedingly high fractional and gravimetric efficiencies. In particular, certain types of known filter media 220 are particularly suitable for filtering very small particle contaminants. As the filter media is not clogged by larger particles due to the action of the variable impactor separator, the filter media is better able to retain this ability to filter very small particles. Additionally, unlike certain conventional filters in which a filter media is provided on its own and must be regularly replaced, because the variable impactor separator 202 removes a large proportion of the contaminants within the blow-by gas the filter media 220 within filter media stage 218 has an extended service life. Typically media elements will block with soot and particulates dependant on the size and density of the media and soot concentration of the blow-by gas. Where typically depth filtration have service intervals between 500 & 2000 hours, the filter media 220 within the separator of FIG. 9 can have an increased service life of between 2000 and 12,000 hours, and may even be serviceable for the life of the engine.

The flow path of blow-by gas through the separator of FIG. 9 is generally the same as that for the separator of FIG. 8 except that after exiting the first separation stage 202 partially cleaned blow-by gas is directed along the path of arrow 246 to the internal chamber 221 of the filter media 220. The gas passes through the filter media 220 to the external chamber 222 and then is directed to the jet pump 204 as before. Due to the high separation efficiency of the first separation stage 202 (up to 95%) the filter media 220 may have a serviceable life of over 12000 hours for blow-by gas with a 1% soot contaminant rate. In a further alternative the cyclonic pre-filter may be omitted from both FIG. 8 and FIG. 9.

A more detailed mathematical explanation of how a multi-stage separator can provide an improvement in gravimetric separation efficiency will now be provided in connection with FIGS. 10 to 16. The present inventors have developed techniques for identifying the minimum fractional efficiency curve required for each component of a multi-stage separator to yield a gravimetric separation efficiency which equals or exceeds the gravimetric efficiency of a comparable single stage device. Using the calculated target fractional efficiency curve the fractional efficiency curves for each stage can be manipulated by control of the differential pressure available from the pump across each stage to fine tune the overall gravimetric efficiency. This understanding can be used to determine the optimal number of separation stages to maximise efficiency for any available vacuum, or to determine the required vacuum (and therefore determine the required pump) and number of stages to meet a given efficiency target. In this way the pump energy requirements to meet a separation target can be minimised.

The performance of a device used for the cleaning of blow-by gases emitted from an engine can be evaluated by collecting the contaminants contained before and after the separator on filter papers over a fixed time period and weighing them in order to calculate a gravimetric separation efficiency.

The gravimetric efficiency of a multi-pass separator can be calculated readily. For example, a second pass through a 50% efficient separator (for any type of inertial separator) will remove a further 50% of the contaminant mass carried over from the first pass. The overall efficiency of the two pass system is therefore 75%. A third pass will yield 88% overall and the fourth 94% etc. For any given efficiency (x, between 0% and 100%) for a single separator stage a mathematical equation can be derived for the overall efficiency of a multi-stage separator ($\mu_n$ where n is the number of similar separator stages in the multi-stage separator):

$$\mu_2 = \left[1 - \left[\left(1 - \frac{x}{100}\right) \cdot \left(1 - \frac{x}{100}\right)\right]\right] \cdot 100$$

$$\mu_3 = \left[1 - \left[\left(1 - \frac{x}{100}\right) \cdot \left(1 - \frac{x}{100}\right) \cdot \left(1 - \frac{x}{100}\right)\right]\right] \cdot 100$$

$$\mu_4 = \left[1 - \left[\left(1 - \frac{x}{100}\right) \cdot \left(1 - \frac{x}{100}\right) \cdot \left(1 - \frac{x}{100}\right) \cdot \left(1 - \frac{x}{100}\right)\right]\right] \cdot 100$$

These equations can be simplified as follows:

$$\mu_2 = -\frac{x \cdot (x - 200)}{100}$$

$$\mu_3 = \frac{x \cdot (x^2 - 300 \cdot x + 30000)}{10000}$$

$$\mu_4 = \frac{x^3}{2500} - \frac{x^4}{1000000} - \frac{3 \cdot x^2}{50} + 4 \cdot x$$

Figure 10:
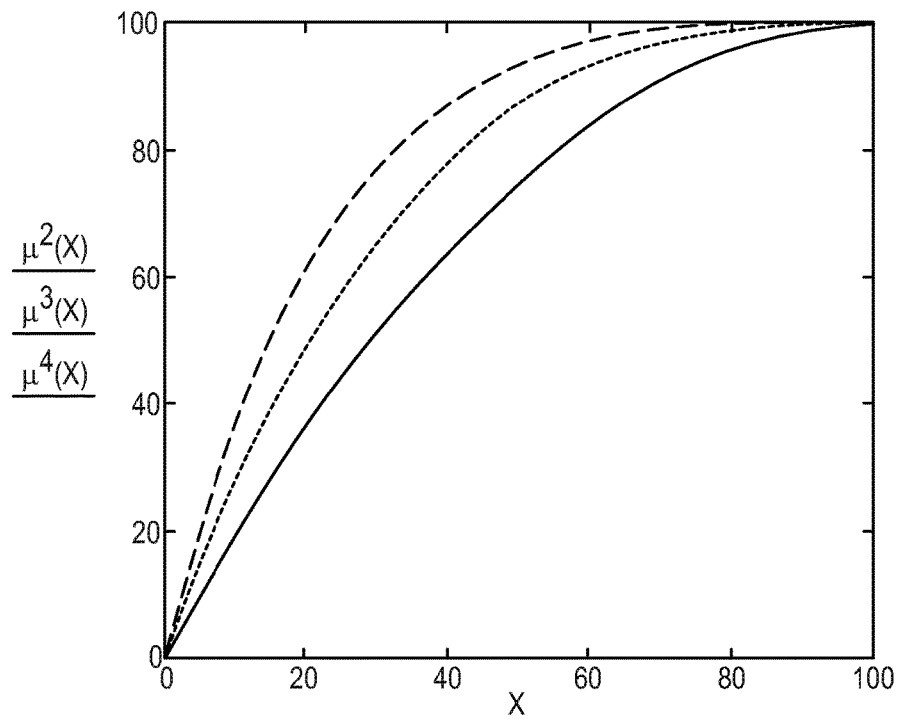
FIG. 10 illustrates the variation of overall gravimetric separation efficiency for multi-stage separators comprising two, three or four impactor separators with the gravimetric separation efficiency of each impactor separator stage.

A graph of the functions above for second, third and fourth pass separators is shown in FIG. 10, which can be used to determine the system efficiency for second, third or fourth pass separators of any given efficiency x. It can be seen that regardless of the number of separator stages, the overall efficiency $\mu$ approaches 100% as the efficiency of each one of the stages x approaches 100%.

It will be understood by the person skilled in the art that an inertial separator having an acceptable pressure differential of for example 40 mbar may exhibit a gravimetric efficiency of approximately 75%. It will also be understood that an inertial separator having a lower pressure differential of 20 mbar will typically yield a lower gravimetric separation efficiency of approximately 44%. Two such separators coupled in series will possess a combined pressure differential of 40 mbar, yet using the graph above it may be determined that the combined multi-stage separator will yield a lesser gravimetric efficiency overall of only 69%. It may be readily deduced that further dividing the available pressure differentials across additional separator stages will deliver increasingly poor results.

As discussed above and described in WO-2009/037496-A2 in the name Parker Hannifin (UK) Ltd, the present inventors have previously developed a device for separating contaminants to an increased level of efficiency by utilizing a pump to artificially increase the pressure differential available for achieving performance improvements. The present inventors have now developed a method for achieving the more efficient use of pump energy for a given aerosol challenge posed by blow-by gas from an engine by the application of multi-pass separation as will now be described.

Figure 11:
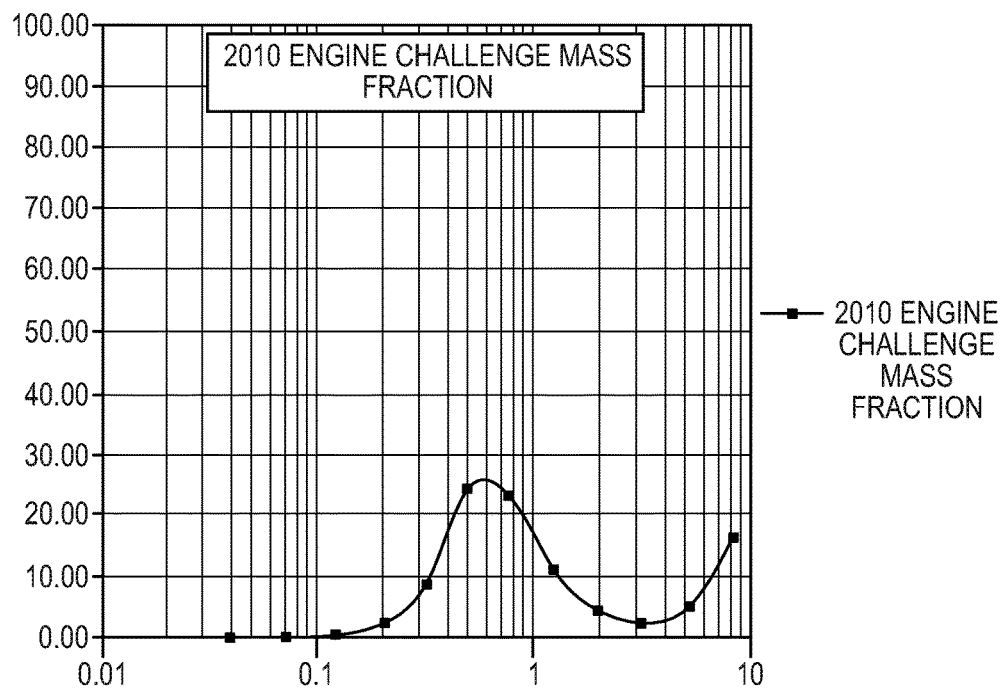
FIG. 11 illustrates the aerosol mass fraction challenge for blow-by gas derived from a 2010 diesel engine between 0.02 µm and 8 µm.

The composition of engine blow-by gases comprises both liquid oil and oil aerosols ranging in size from 0.035 microns to 10 microns. Using existing equipment the characteristic mass fractions produced by an individual engine may be measured. An example is shown in FIG. 11 for a 2010 diesel engine in which the proportional make up of the blow-by gas is plotted against particle size in µm. FIG. 11 shows a significant concentration of contaminants between approximately 0.2 μm and 1.5 μm and above 5 μm.

Figure 12:
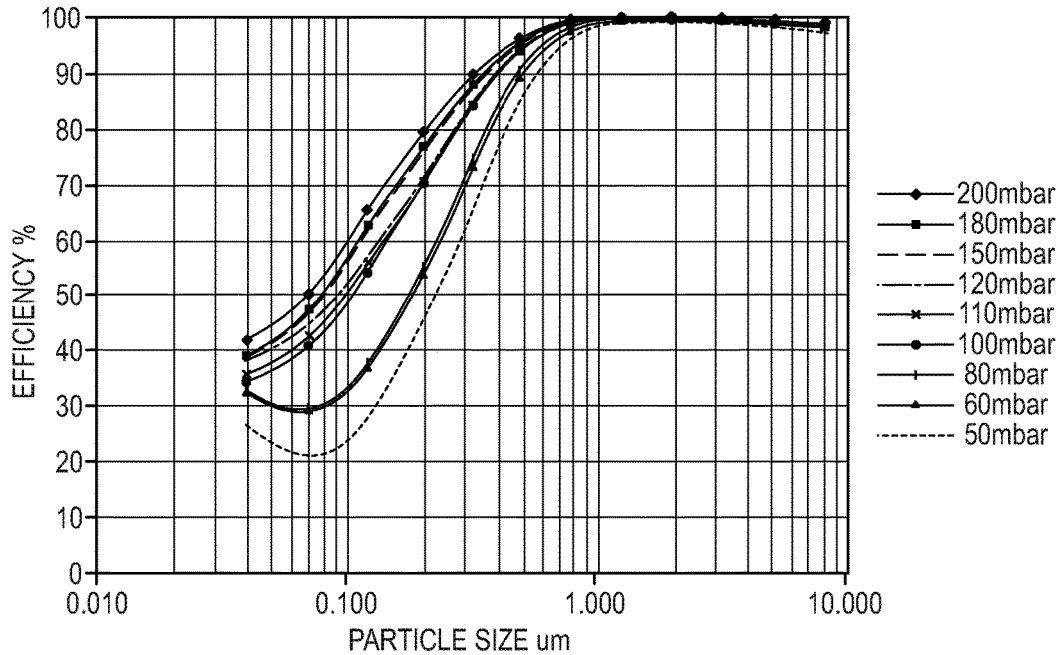
FIG. 12 illustrates the interdependence between pressure differential and fractional separation efficiency for a single stage variable impactor separator.

Similarly, using the same existing equipment the separation efficiency of a variable impactor separator of the type generally described above in connection with FIGS. 5 to 7 can be plotted over the same range of particle sizes. The fractional separation efficiencies of such variable impactor separators have been characterised over a range of pumped pressure differentials and this data is shown in FIG. 12. It can be seen that increasing the pressure differential raises the fractional separation efficiency curve.

In order to maximise the gravimetric separation efficiency while simultaneously minimising the pump energy it is necessary to tailor a multi-stage separator to achieve the highest possible efficiency at specific particle sizes corresponding to significant oil mass fractions generated by a given engine. The pressure differential across each separator stage can be chosen to tune each stage to separate particles from a chosen part of the aerosol challenge illustrated in FIG. 11. To maximise overall gravimetric separation efficiency it is not sufficient to simply couple multiple separators in series, with or without the power provided by a pump.

A mathematical function defining the minimum fractional efficiency curve required for each separator stage in order for a multi-pass system to yield equal performance to that measured from of a single pass separator can be determined Re-arranging the previous equations for second, third and fourth pass systems in terms of x achieves this. Note that the second, third and fourth pass equations are second third and fourth order polynomials and therefore have multiple solutions:

For a two stage separator:

$$\left( \begin{array}{c} 50 \cdot \sqrt{4 - \frac{\mu_2}{25}} + 100 \\ 100 - 50 \cdot \sqrt{4 - \frac{\mu_2}{25}} \end{array} \right)$$

For a three stage separator:

$$\left[ \begin{array}{c} (10000\mu_3 - 1000000)^{\frac{1}{3}} + 100 \\ \frac{\sqrt{3} \cdot (10000\mu_3 - 1000000)^{\frac{1}{3}} \cdot i}{2} - \frac{(10000\mu_3 - 1000000)^{\frac{1}{3}}}{2} + 100 \\ 100 - \frac{(10000\mu_3 - 1000000)^{\frac{1}{3}}}{2} - \frac{\sqrt{3} \cdot (10000\mu_3 - 1000000)^{\frac{1}{3}} \cdot i}{2} \end{array} \right]$$

For a four stage separator:

$$\left[ \begin{array}{c} 500 \cdot \sqrt{2} \cdot \left( \frac{1}{2500} - \frac{\mu_4}{250000} \right)^{\frac{1}{4}} + 100 \\ 100 - 500 \cdot \sqrt{2} \cdot \left( \frac{1}{2500} - \frac{\mu_4}{250000} \right)^{\frac{1}{4}} \\ 500 \cdot \sqrt{2} \cdot \sqrt{-\sqrt{\frac{1}{2500} - \frac{1}{250000} \cdot \mu_4}} + 100 \\ 100 - 500 \cdot \sqrt{2} \cdot \sqrt{-\sqrt{\frac{1}{2500} - \frac{1}{250000} \cdot \mu_4}} \end{array} \right]$$

$\mu_2$, $\mu_3$ and $\mu_4$ vary between 0 and 100%. Simplifying these equations further yields:

$$f(\mu_2) := 100 - 50 \cdot \sqrt{4 - \frac{\mu_2}{25}}$$

$$f(\mu_3) := (10000 \cdot \mu_3 - 1000000)^{\frac{1}{3}} + 100$$

$$f(\mu_4) := 100 - 500 \cdot \sqrt{2} \cdot \left( \frac{1}{2500} - \frac{\mu_4}{250000} \right)^{\frac{1}{4}}$$

Figure 13:
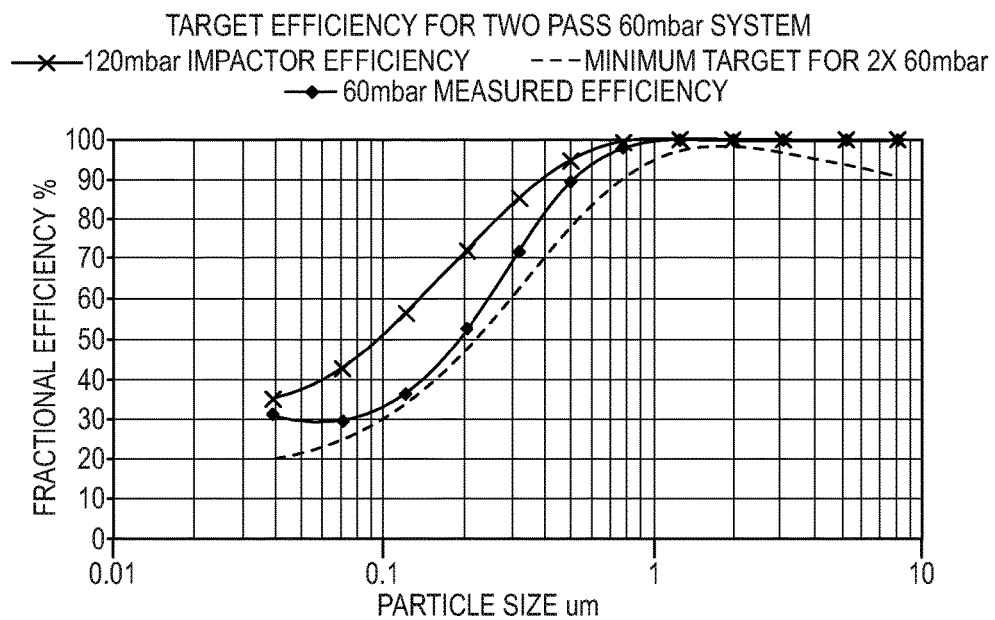
FIG. 13 illustrates the fractional separation efficiency of 120 mBar and 60 mBar variable impactor separators, and the target fractional separation efficiency of each of two 60 mBar variable impactor separators in a two stage separator.
Figure 14:
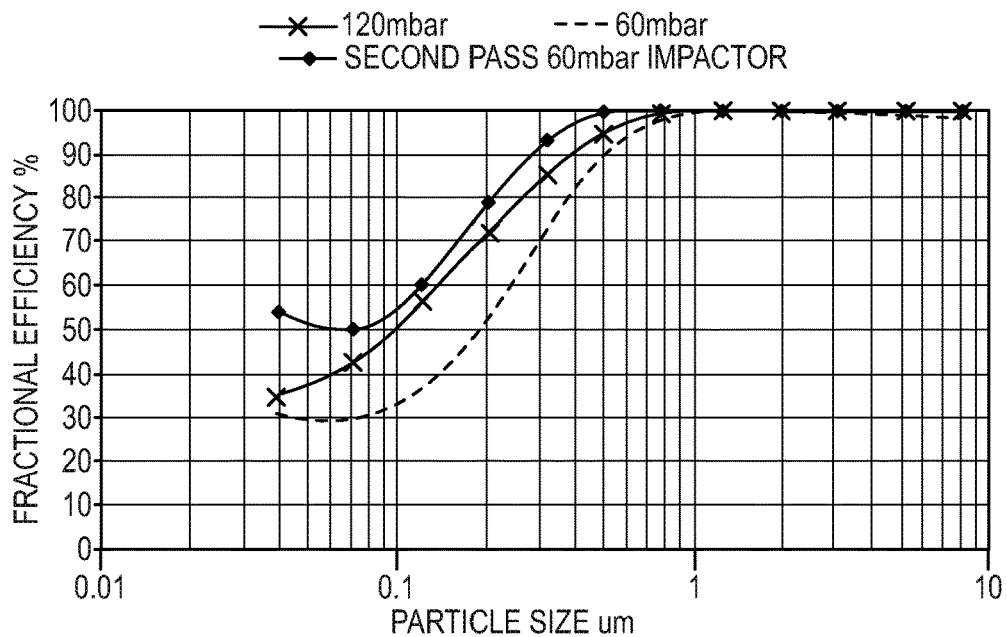
FIG. 14 illustrates the fractional separation efficiency of 120 mBar and 60 mBar variable impactor separators, and a two stage separator comprising two 60 mBar variable impactor separators coupled together in series.

From this, in order to design a multi-pass separator system capable of yielding higher gravimetric separation efficiency than a known single pass device of equal total pressure differential, the minimum required fractional separation efficiency at each particle size in the region of interest for the aerosol challenge shown in FIG. 11 can be calculated. FIG. 13 shows the fractional separation efficiency for a single variable impactor separator having a pressure differential of 120 mBar, the required target fractional separation efficiency for each of two 60 mBar variable impactor separators and the measured fractional separation efficiency for an exemplary 60 mBar variable impactor separator. It can be seen that the performance of the exemplary 60 mBar separator exceeds the required performance of each stage of the multi-stage system. Any device above the derived target curve will yield on overall improvement in gravimetric efficiency, while any device below it will not. Consequently FIG. 13 shows that according to the mathematical model developed by the present inventors two 60 mbar variable impactor separators in series can yield higher efficiency than a single 120 mbar separator. This result is confirmed in FIG. 14 which shows the measured fractional separation efficiency for a single 60 mBar variable impactor separator, a single 120 mBar variable impactor separator and two 60 mBar variable impactor separators coupled in series. The performance of the two 60 mBar separators coupled in series exceeds the performance of the single 120 mBar separator through out the particle size region of interest.

Figure 15:
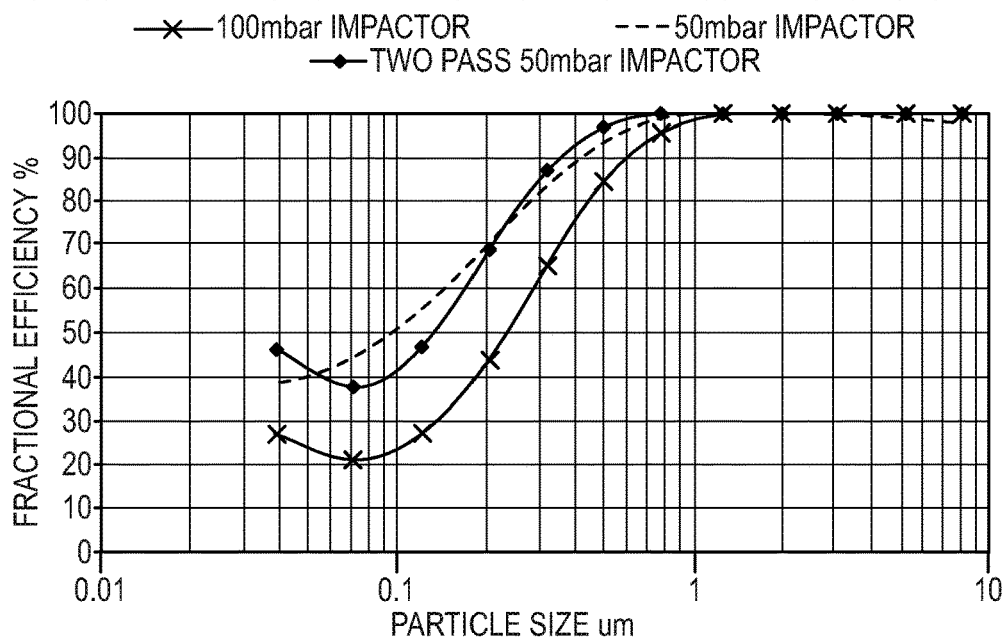
FIG. 15 illustrates the fractional separation efficiency of 100 mBar and 50 mBar variable impactor separators, and a two stage separator comprising two 50 mBar variable impactor separators coupled together in series.

Using the above described techniques, the skilled person will understand how a multi-pass variable impactor separator of the type illustrated in FIG. 8 can be specifically designed to deliver previously unattained gravimetric efficiencies when challenged by a characterised engine blow-by gas aerosol distribution. FIG. 15 illustrates the fractional separation efficiency for a single 50 mBar separator, a single 100 mBar separator and two 50 mbar separators in series. It can be seen that the performance of the two 50 mBar separators in series is not uniformly higher than the performance of the single 100 mBar separator, but is higher in the particular region of interest shown in FIG. 11 for particles larger than 0.2 μm. This example shows how such a multi-stage variable impactor separator would yield an overall system improvement if the greater portion of engine challenge mass fractions is above 0.2 microns, while a loss in performance will result when challenge mass fractions are below 0.2 microns. This illustrates the importance of considering the particular aerosol challenge to be addressed when designing a multi-stage separator. Simply coupling previously available separators in series is no guarantee of a performance increase, unless there is also a significant increase in pump energy. Without this full understanding of the process behind separation in a multi-stage separator and how this may be tuned to a particular fluid to be separated there would be nothing to suggest to the skilled person modifying an existing separator by the addition of a further separation stage as to do so would be likely to lead to no significant improvement.

Figure 16:
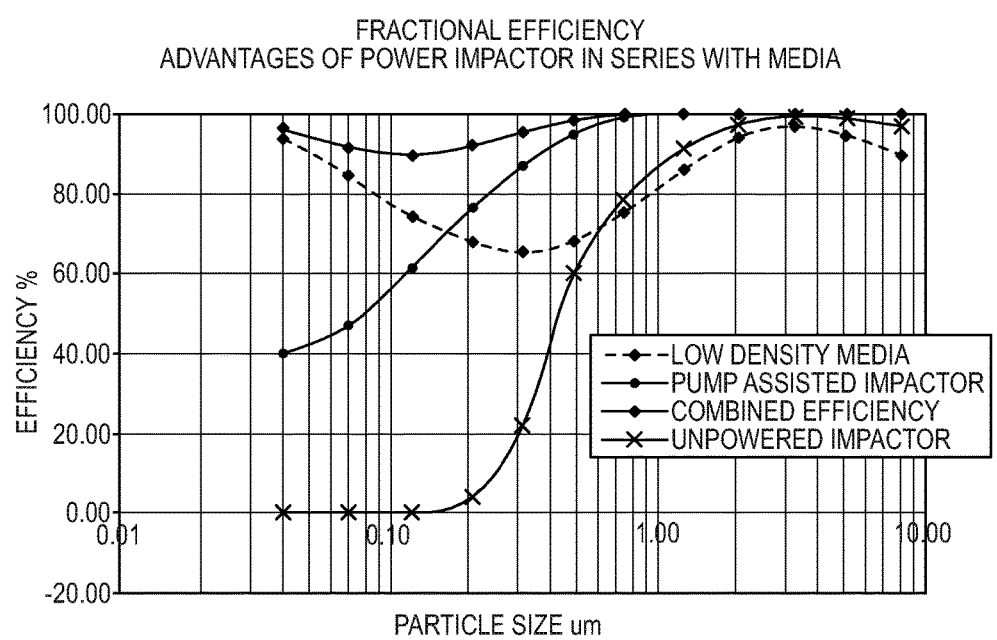
FIG. 16 illustrates the fractional separation efficiency of an unpowered variable impactor separator, a pump assisted variable impactor separator, a low density filter media and the combination of a pump assisted variable impactor separator and a low density filter media coupled together in series.

Similarly the performance of a powered multi-stage separator of the type illustrated in FIG. 9, comprising a variable impactor inertial separator and a pass through filter media, can be modelled. FIG. 16 illustrates the fractional separation efficiency of an unpowered variable impactor separator, a pump assisted variable impactor separator, a low density filter media and the combination of a pump assisted variable impactor separator and a low density filter media coupled together in series. One skilled in the art of fluid separation will understand that the mid range dip in the fractional efficiency for the filter media around 0.35 µm is due to the physics of the inherent impaction, interception and diffusion separation mechanisms within the filter media. However, FIG. 16 illustrates the known property of such filter medias to achieve high efficiency for particle sizes below 0.1 µm.

It will be appreciate from FIG. 16 that the combination of an unpowered impactor and a filter media would yield little improvement, beyond extending the service life of the filter media. However, following the understanding of how gravimetric separation efficiency can be improved by tailoring the fractional separation efficiency of each stage of a multistage separator to a particular aerosol challenge, the present inventors have identified that a combined system including a filter media and a powered impactor separator may provide significantly improved gravimetric separation efficiency. The combined system benefits from the strengths of each stage, by tuning the fractional efficiency of the variable impactor separator, to yield a gravimetric result of around 99% or higher for blow-by gas—levels of separation efficiency which have previously unachievable in the industry.

The separator may typically be made from a polymeric material, for example glass filled nylon. Other constructions and materials will be readily apparent to the appropriately skilled person. For example, the pump nozzle may be made from a sintered or metal injection moulded part. The various parts of the separator may be joined together using appropriated fixing techniques, which will be well known to the skilled person, such as clips, bolts, adhesive or welding. Seals such as O-rings may be provided to prevent leakage from the separator. The various parts of the separator may be provided in a modular system in which additional stages may be incorporated or switched in order with minimal modification.

Although the embodiments of the invention illustrated in FIGS. 8 and 9 make use of a jet pump in order to increase the pressure differential across the multi-stage separator, the present invention is not limited to this. Any known form of pump for generating a vacuum to draw blow-by gas through the separator may be used in order to allow multiple separators to be used in series to provide higher overall gravimetric and fractional separation efficiencies. For instance, in certain embodiments of the invention an electrically or hydraulically driven pump may be used.

While the embodiments of the invention illustrated in FIGS. 8 and 9 make reference to oil being drained from the separator and returned to the crankcase, the oil and other contaminants may be stored outside of the crankcase or disposed of. Similarly, filtered blow-by gas is not necessarily passed to the engine air intake, for instance it may be discharged to atmosphere to avoid any residual contamination damaging the engine, or may be processed by the exhaust system. In a further modification, the boost gas may be derived any source of pressurised gas, for instance exhaust gas, compressed gas from a turbocharger or an engine intake manifold, compressed gas from a vehicle braking system or other sources. Other possible configurations will be readily apparent to the appropriately skilled person.

Although particular separators described above relate primarily to the use of the described separator for separating particulate and liquid aerosol contaminants from a blow-by gas stream within a reciprocating engine, the present invention is not limited to this. Indeed, the separator can be used to separate contaminants from a gas stream derived from other forms of internal combustion engine. More generally, the present invention can be applied to separate contaminants from any gas stream, such as compressed air lines, separating cutting fluid from gas streams in machine tools and separating oil mist in industrial air compressors. More generally still, the present invention can be used to separate contaminants from any fluid stream. That is, it may also be applied to liquid streams. The separator may be advantageously used to separate contaminants from an oil or fuel supply within an internal combustion engine.

The separator may comprise a stand alone device. Alternatively, it may readily be integrated into other engine components, for example an engine valve cover, timing cover, crankcase, cylinder head, engine block or turbocharger. The separator may be mounted directly on the engine, or mounted away from the engine.

Further modifications and applications of the present invention will be readily apparent to the appropriately skilled person, without departing from the scope of the appended claims.

What is claimed is:

1. A separator for separating contaminants from a fluid stream, the separator comprising:
   a. a first inlet to receive a first fluid stream including entrained contaminants;
   b. first and second separation stages fluidly coupled together in series and fluidly coupled to the first inlet to receive the first fluid stream from the first inlet and each arranged to separate contaminants from the first fluid stream; and
   c. a pump fluidly coupled to the second separation stage to generate an area of reduced pressure to draw the first fluid stream through the first and second separation stages;
   wherein one of the separation stages comprises a variable impactor separator comprising:
      i. a first chamber to receive the first fluid stream;
      ii. a second chamber fluidly coupled to the first chamber through at least one aperture such that the first fluid stream is accelerated along a path through the aperture and is incident upon an impaction surface in the second chamber in the path of the first fluid stream such that contaminants are separated from the first fluid stream; and
      iii. an actuator to control the flow through the at least one aperture according to a pressure differential between fluid pressure in the first chamber and a reference fluid pressure in a third chamber; and
   wherein the other of the separation stages comprises a filter media, and each of the separation stages includes a drain, and an oil drain path is defined from the second separation stage through a first drain into the first separation stage, and then through the first separation stage through a second drain, to a drain outlet; wherein the one of the separation stages comprises a variable impactor separation stage, and the other of the separation stages comprises a filter media separation stage, and the filter media separation stage is located vertically above the variable impactor separation stage, and the drain path is defined through both stages such that contaminants removed from the filter media separation stage can drain down through the first drain and into the variable impactor separation stage to the second drain, and then through the second drain to the drain outlet; wherein the other of the separation stages comprises the second separation stage and includes an interior chamber surrounded by and internal to the filter media, fluidly coupled to the first separation stage, and an exterior chamber surrounding and external to the filter media, fluidly coupled to the pump; further including a sump in the exterior chamber for collecting contaminants, and the drain in the second separation stage is located in the sump; further including a check valve within the drain of the second separation stage preventing oil flow in a reverse direction through the oil flow path.

2. A separator according to claim 1, wherein each of the separation stages includes a sump for collecting contaminants, and the drain in each stage is located in a respective sump.

3. A separator according to claim 2, wherein each of the drains includes a valve preventing oil flow in a reverse direction through the oil flow path.

4. A separator according to claim 3, wherein each drain valve is a check valve.

5. A separator according to claim 1, wherein the other of the separation stages comprises the second separation stage and includes an interior chamber surrounded by and internal to the filter media, and an exterior chamber surrounding and external to the filter media, wherein the pump draws the fluid stream through the filter media from one chamber to the other.

6. A separator according to claim 5, further including a sump in one of the chambers for collecting contaminants, and the drain in the second separation stage is located in the sump.

7. A separator according to claim 6, further including a check valve within the drain of the second separation stage preventing oil flow in a reverse direction through the oil flow path.

8. A separator according to claim 1, wherein the other of the separation stages comprises the second separation stage and includes an interior chamber surrounded by and internal to the filter media, and an exterior chamber surrounding and external to the filter media, wherein the pump draws the fluid stream through the filter media from the first stage.

9. A separator according to claim 8, further including a sump in the exterior chamber for collecting contaminants, and the drain in the second separation stage is located in the sump.

10. A separator according to claim 9, further including a check valve within the drain of the second separation stage preventing oil flow in a reverse direction through the oil flow path.

11. A separator according to claim 1, wherein the one of the separation stages comprises the first separation stage, and the second separation stage includes a sump for collecting contaminants, and the drain in the second separation stage is located in the sump and comprises a valve preventing oil flow in a reverse direction through the oil flow path, and wherein a fluid stream path is defined between the second chamber of the first separation stage and the second separation stage, and the fluid stream path and the oil drain path are coincident through the first separation stage, wherein during operation of the separator, the reduced pressure generated by the pump causes the check valve in the second separation stage to remain in a closed condition and prevents oil collected in the sump from draining into the fluid stream path in the first separation stage.

12. The separator as in claim 1, wherein the oil drain path is defined through both separation stages, to a single drain outlet.

13. The separator as in claim 1, where drain path extends from the exterior chamber of the second separator stage, through the first drain, to an exterior chamber of the variable impactor separator, and then to the drain outlet.

* * * * *